(12) United States Patent
Song et al.

(10) Patent No.: US 12,444,181 B2
(45) Date of Patent: Oct. 14, 2025

(54) ELECTRONIC APPARATUS FOR APPLYING PERSONALIZED ARTIFICIAL INTELLIGENCE MODEL TO ANOTHER MODEL

(71) Applicant: SAMSUNG ELECTRONICS CO., LTD., Suwon-si (KR)

(72) Inventors: Juyong Song, Suwon-si (KR); Jaedeok Kim, Suwon-si (KR); Jungwook Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 576 days.

(21) Appl. No.: 17/006,120

(22) Filed: Aug. 28, 2020

(65) Prior Publication Data

US 2021/0065000 A1 Mar. 4, 2021

Related U.S. Application Data

(60) Provisional application No. 62/893,995, filed on Aug. 30, 2019.

(30) Foreign Application Priority Data

Oct. 31, 2019 (KR) .................. 10-2019-0138116

(51) Int. Cl.
*G06V 10/82* (2022.01)
*G06F 8/71* (2018.01)
(Continued)

(52) U.S. Cl.
CPC ............... *G06V 10/82* (2022.01); *G06F 8/71* (2013.01); *G06N 3/04* (2013.01); *G06N 3/08* (2013.01)

(58) Field of Classification Search
None
See application file for complete search history.

(56) References Cited

U.S. PATENT DOCUMENTS 7,092,922 B2   8/2006   Meng et al.
7,283,902 B2   10/2007  Heider et al.
(Continued)

FOREIGN PATENT DOCUMENTS

CN   106548190 A   3/2017
CN   108243216 A   7/2018
(Continued)

OTHER PUBLICATIONS

Chen, "Net2Net: Accelerating Learning Via Knowledge Transfer," pp. 1-12 (Year: 2016).*
(Continued)

*Primary Examiner* — Michael J Huntley
*Assistant Examiner* — Paul J Breene
(74) *Attorney, Agent, or Firm* — Sughrue Mion, PLLC

(57) ABSTRACT

An electronic apparatus includes at least one memory configured to store at least one instruction and a first neural network model; a communicator comprising communication circuitry; and at least one processor configured to execute the at least one instruction to: receive, from an external electronic device, information on a second neural network model stored in the external electronic device through the communicator; compare the first neural network model with the second neural network model based on the information on the second neural network model; and control the communicator to transmit, to the external electronic device, information on a weight between nodes of the first neural network model based on comparison between the second neural network model and the first neural network model.

11 Claims, 24 Drawing Sheets

(51) Int. Cl.
  *G06N 3/04*   (2023.01)
  *G06N 3/08*   (2023.01)

(56)     References Cited

U.S. PATENT DOCUMENTS

| | | | |
|---|---|---|---|
| 10,410,114 | B2 | 9/2019 | Kang et al. |
| 10,771,488 | B2* | 9/2020 | Verma .................... G06N 5/022 |
| 11,263,540 | B2* | 3/2022 | Kirchhoff ........... G06F 11/3447 |
| 11,861,499 | B2 | 1/2024 | Song et al. |
| 2004/0200896 | A1 | 10/2004 | Eckerl |
| 2017/0024641 | A1* | 1/2017 | Wierzynski ............ G06N 3/045 |
| 2017/0083829 | A1 | 3/2017 | Kang et al. |
| 2017/0178024 | A1 | 6/2017 | Kida |
| 2018/0005134 | A1* | 1/2018 | Kish ...................... G06N 3/084 |
| 2019/0050715 | A1 | 2/2019 | Ooi et al. |
| 2019/0065506 | A1 | 2/2019 | Li et al. |
| 2019/0065951 | A1 | 2/2019 | Luo et al. |
| 2019/0228294 | A1 | 7/2019 | Hwang |
| 2019/0266446 | A1 | 8/2019 | Gorban |
| 2020/0014761 | A1 | 1/2020 | Kawaai et al. |
| 2020/0134473 | A1 | 4/2020 | Miyato |
| 2020/0175371 | A1* | 6/2020 | Kursun .................. G06N 3/045 |
| 2020/0320344 | A1* | 10/2020 | Ma .......................... G06N 3/04 |
| 2020/0364574 | A1 | 11/2020 | Kim et al. |
| 2020/0394514 | A1 | 12/2020 | Cho et al. |

FOREIGN PATENT DOCUMENTS

| | | | | |
|---|---|---|---|---|
| CN | 109784159 | A | | 5/2019 |
| CN | 112836792 | A | * | 5/2021 ............. G06F 7/14 |
| JP | 4122779 | B2 | | 7/2008 |
| JP | 6561004 | B2 | | 8/2019 |
| KR | 1020160004076 | A | | 1/2016 |
| KR | 1020190051857 | A | | 5/2019 |
| KR | 10-2019-0072450 | A | | 6/2019 |
| KR | 10-2020-0132627 | A | | 11/2020 |
| WO | 2018/173121 | A1 | | 9/2018 |
| WO | 2018/175098 | A1 | | 9/2018 |
| WO | 2019004350 | A1 | | 1/2019 |
| WO | 2019128547 | A1 | | 7/2019 |
| WO | WO-2019134753 | A1 | * | 7/2019 |

OTHER PUBLICATIONS

Wei, "Network Morphism," pp. 1-11 (Year: 2016).*
"A Basic Introduction to Neural Networks" (Year: 2017).*
"Ennui ~Elegant Neural Network User Interface~ Tutorial," Jesse Michel, Youtube, Apr. 2, 2019. (Year: 2019).*
"The Importance of User Interface Design in App Development," Linkedin, AlgoRepublic (Year: 2023).*
"Feedback Control by Online Learning an Inverse Model," Waegeman et al; Waegeman, IEEE Transactions on Neural Networks and Learning Systems, vol. 23, No. 10, Oct. 2012. (Year: 2012).*
Communication issued Jun. 15, 2022 by the European Patent Office in counterpart European Patent Application No. 20857122.4.
Written Opinion (PCT/ISA/237) issued by the International Searching Authority in corresponding International Application No. PCT/KR2020/011443, on Dec. 11, 2020.
International Search Report (PCT/ISA/210), issued by International Searching Authority in corresponding International Application No. PCT/KR2020/011443, on Dec. 11, 2020.
Communication issued Jan. 31, 2024 by the Korean Intellectual Property Office in Korean Patent Application No. 10-2019-0138116.
Communication dated Jun. 28, 2024, issued by the China National Intellectual Property Administration in counterpart Chinese Application No. 202080056436.6.
Office Action dated Dec. 27, 2024, issued by the Chinese Patent Office in Chinese Patent Application No. 202080056436.6.
Office Action dated Feb. 19, 2025, issued by the Chinese Patent Office in Chinese Patent Application No. 202080056436.6.
Communication issued on May 19, 2025 by the China National Intellectual Property Administration in Chinese Patent Application No. 202080056436.6.

* cited by examiner

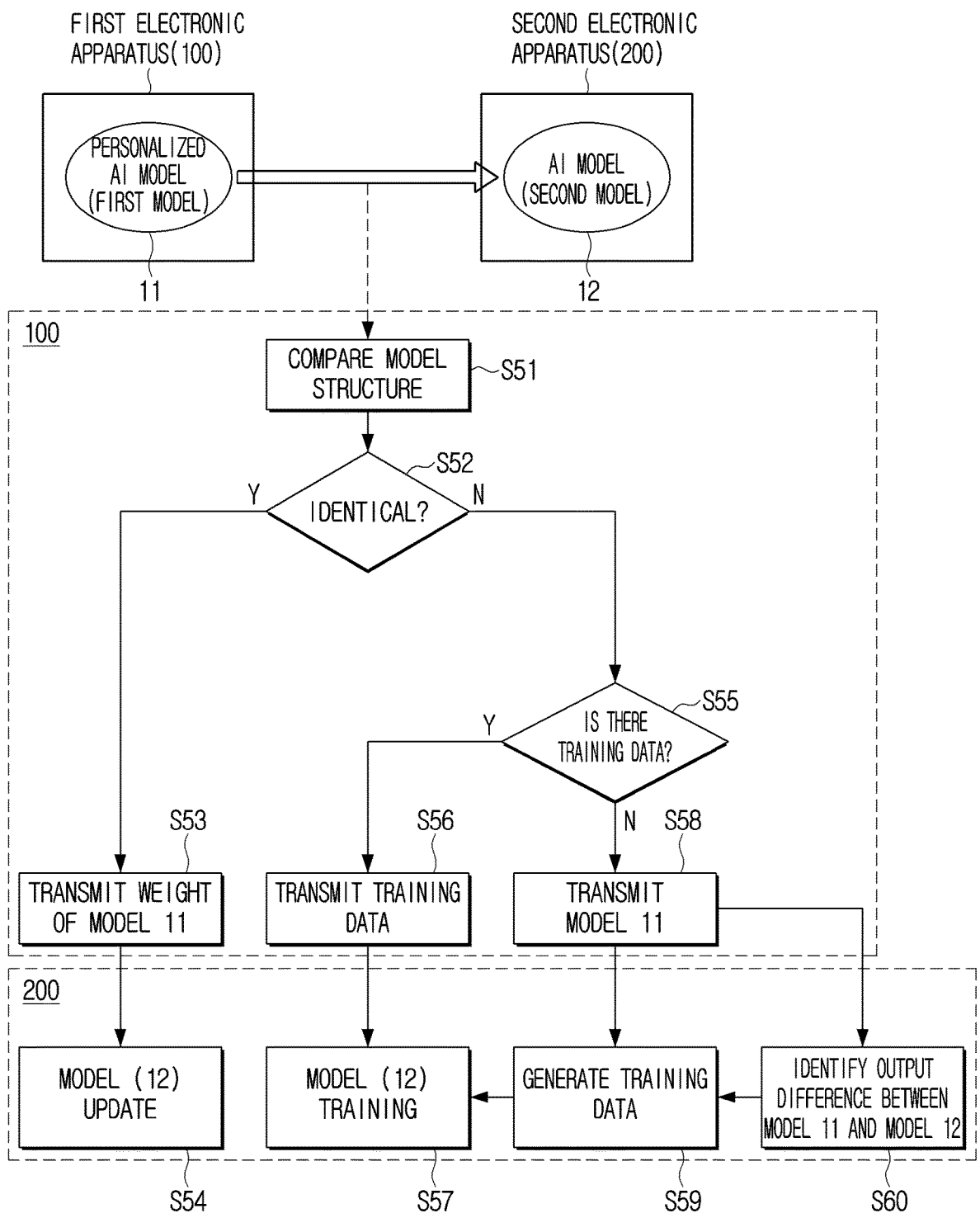

FIG. 2A
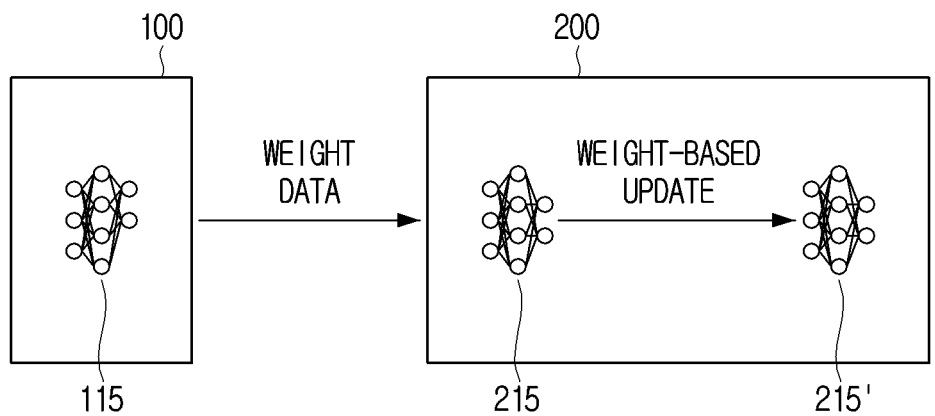
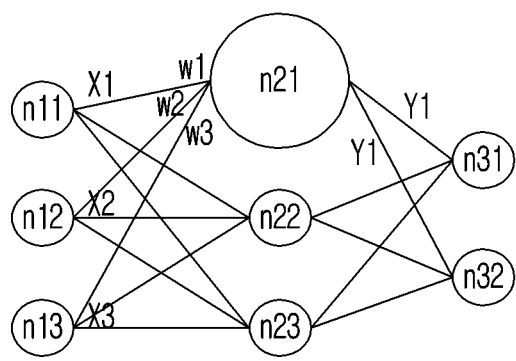
$Y1 = f21(w1X1 + w2X2 + w3X3 + b)$
215
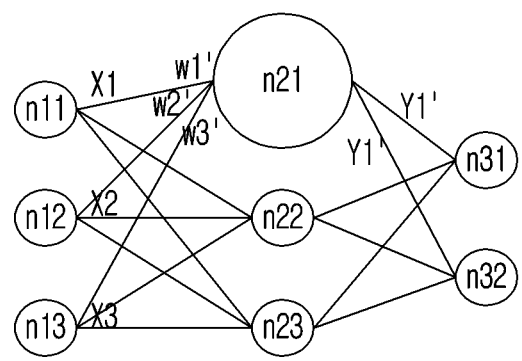
$Y1' = f21'(w1'X1 + w2'X2 + w3'X3 + b')$
215'

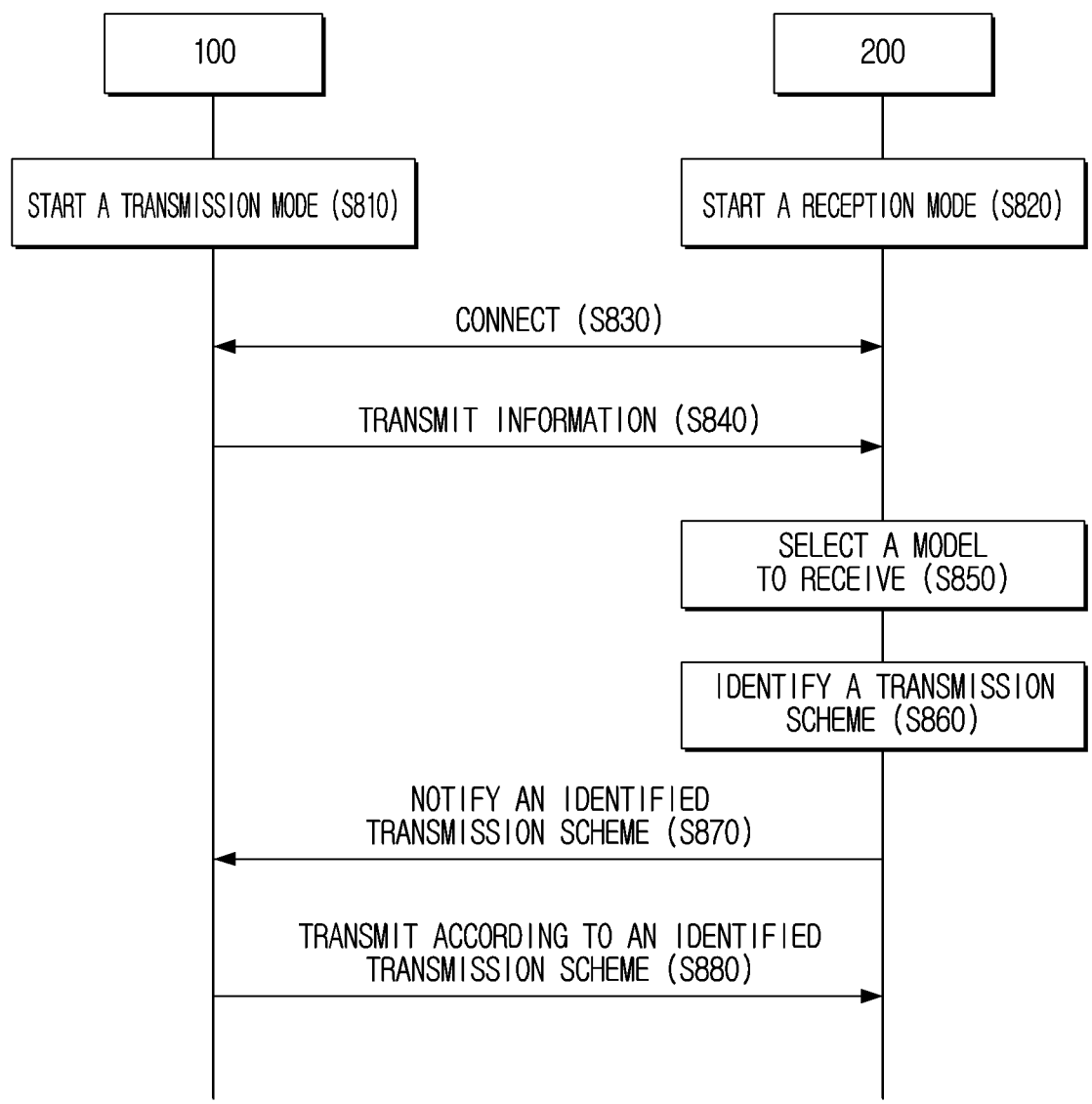

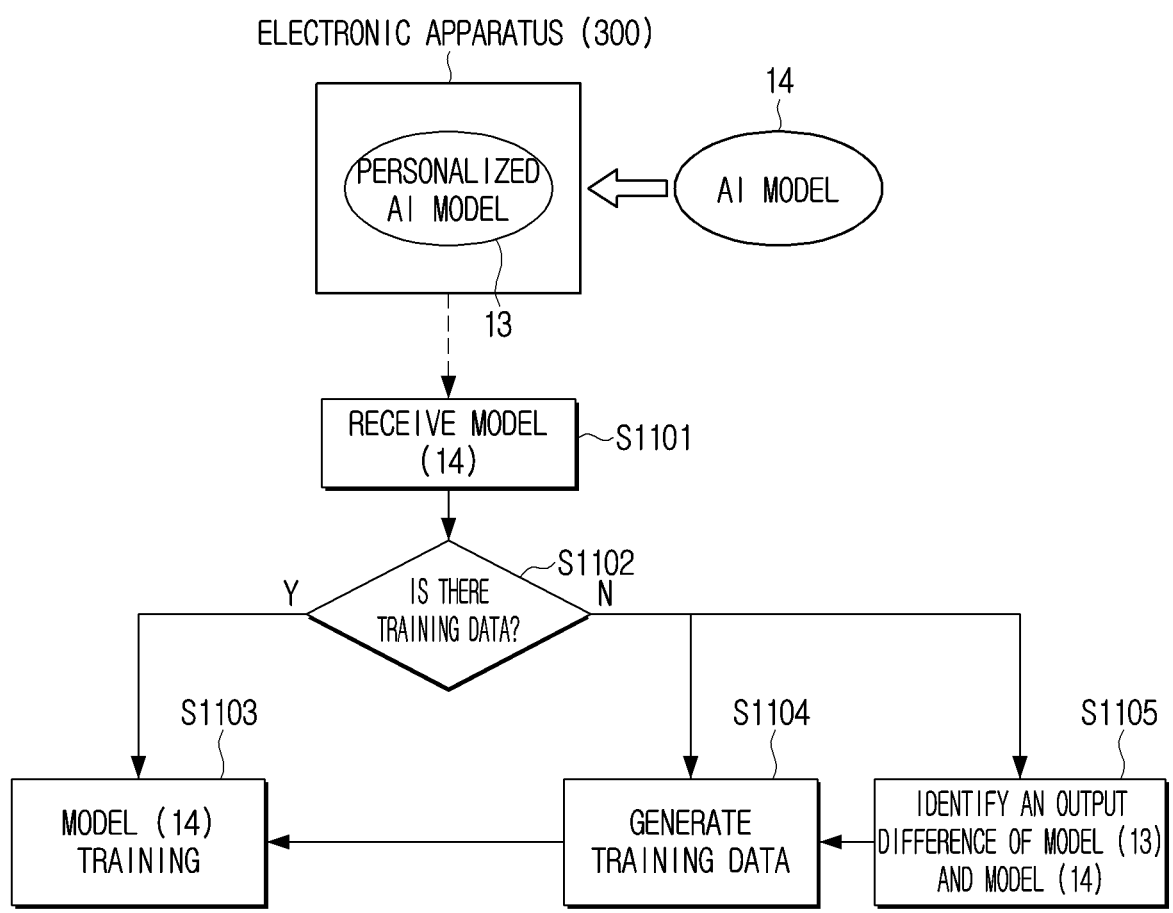

ELECTRONIC APPARATUS FOR APPLYING PERSONALIZED ARTIFICIAL INTELLIGENCE MODEL TO ANOTHER MODEL

CROSS-REFERENCE TO RELATED APPLICATION

This application is based on and claims priority under 35 U.S.C. § 119 to U.S. Provisional Patent Application No. 62/893,995, filed on Aug. 30, 2019, in the United States Patent and Trademark Office, and Korean Patent Application No. 10-2019-0138116, filed on Oct. 31, 2019, in the Korean Intellectual Property Office, the disclosure of which are incorporated by reference herein in their entireties.

BACKGROUND

Field

The disclosure relates to an electronic apparatus that applies a personalized or customized neural network model to another neural network model. More particularly, the disclosure relates to an electronic apparatus to effectively reflect a result of training in a personalization or customization of a personalized or customized neural network model to another electronic apparatus or another neural network model.

Description of Related Art

An artificial neural network model may be designed and trained to perform a wide variety of functions, and an application technology thereof includes image processing, speech recognition, inference/prediction, knowledge representation and motion control, or the like.

The neural network model may be stored in a user's electronic apparatus, and may be trained and personalized based on the user's individual input or user's personal information in the electronic apparatus.

A server, such as an application provider, may improve the performance of the previously distributed neural network model of an old version, thereby to distribute an updated new version of the neural network model or the more advanced type of deep neural network model.

If the new version neural network model is received, the personalized artificial intelligence (AI) model is no longer used by using the old version neural network model in the apparatus and thus, there is an inconvenience to train the new version neural network model again for personalization.

If a new device is purchased, there is a need to bring and use an experience of a personal AI model that has been personalized at the previous apparatus.

SUMMARY

According to an aspect of an embodiment of the present disclosure, there is provided an electronic apparatus including: at least one memory configured to store at least one instruction and a first neural network model; a communicator comprising communication circuitry; and at least one processor configured to execute the at least one instruction to: receive, from an external electronic device, information on a second neural network model stored in the external electronic device through the communicator; compare the first neural network model with the second neural network model based on the information on the second neural network model; and control the communicator to transmit, to the external electronic device, information on a weight between nodes of the first neural network model based on comparison between the second neural network model and the first neural network model.

The at least one processor may be further configured to execute the at least one instruction to: identify whether a version of the first neural network model is identical to a version of the second neural network model based on the received information on the second neural network model, and based on the version of the first neural network model being identical to the version of the second neural network version, control the communicator to transmit, to the external electronic device, the information on the weight between the nodes of the first neural network model.

The at least one processor may be further configured to execute the at least one instruction to: based on a node added to the first neural network model to customize the first neural network model in the electronic apparatus, control the communicator to transmit, to the external electronic device, information on the added node and the information on the weight between the nodes of the first neural network model.

The at least one processor may be further configured to execute the at least one instruction to, based on the version of the first neural network model and the version of the second neural network model being different, control the communicator to transmit one of the first neural network model and training data used to customize the first neural network model.

The at least one processor may be further configured to execute the at least one instruction to: based on the version of the first neural network model being different from the version of the second neural network model, identify whether training data used for training of the first neural network model is stored in the at least one memory, and based on the training data being stored in the at least one memory, control the communicator to transmit the training data to the external electronic device.

The at least one processor may be further configured to execute the at least one instruction to: based on the training data not being stored in the at least one memory, control the communicator to transmit the first neural network model to the external electronic device.

According to an aspect of another embodiment of the present disclosure, there is provided an electronic apparatus including: at least one memory configured to store at least one instruction and a second neural network model; a communicator comprising circuitry; and at least one processor configured to execute the at least one instruction to: receive, from an external electronic device, information on a first neural network model stored in the external electronic device through the communicator; identify a difference between the first neural network model and the second neural network model based on the received information on the first neural network model; and update the second neural network model based on the difference between the first neural network model and the second neural network model.

The at least one processor may be further configured to execute the at least one instruction to: based on receiving information on a weight between nodes of the first neural network model, from the external electronic device through the communicator, update the second neural network model based on the weight between the nodes.

The at least one processor may be further configured to execute the at least one instruction to: based on receiving information on a node added to the first neural network model and the information on the weight between the nodes of the first neural network model, from the external device through the communicator, update the second neural network model based on the received information on the node and the information on the weight between the nodes.

The at least one processor may be further configured to execute the at least one instruction to: based on receiving training data used to customize the first neural network model, from the external device through the communicator, train the second neural network model based on the received training data.

The at least one processor may be further configured to execute the at least one instruction to: based on receiving the first neural network model through the communicator, generate training data using the first neural network model; and train the second neural network model based on the generated training data.

The at least one processor may be further configured to execute the at least one instruction to: based on receiving the first neural network model through the communicator, obtain one or more input value to cause output data of the first neural network model to have a specific output value, and train the second neural network model based on the output value and the one or more input value.

The at least one processor may be further configured to execute the at least one instruction to: obtain first output data by inputting first input data to the first neural network model, and obtain second output data by inputting the first input data to the second neural network model; based on the first output data being different from the second output data, store the first input data and the first output data in the at least one memory; and train the second neural network model based on the first input data and the first output data stored in the at least one memory.

The at least one processor may be further configured to execute the at least one instruction to: while input data for using the second neural network model not being input, train the second neural network model based on the generated training data.

According to an aspect of another embodiment of the present disclosure, there is provided an electronic apparatus including: at least one memory configured to store at least one instruction and a first neural network model; a communicator comprising communication circuitry; and at least one processor configured to execute the at least one instruction to: based on receiving a user command to download a second neural network model that is an update version of the first neural network model, receive the second neural network model from a server device through the communicator; and train the received second neural network model based on information on the first neural network model and information on the second neural network information.

The at least one processor may be further configured to execute the at least one instruction to: based on training data of the first neural network model being stored in the at least one memory, train the received second neural network model based on the stored training data.

The at least one processor may be further configured to execute the at least one instruction to: based on training data of the first neural network model not being stored in the at least one memory, generate the training data using the first neural network model and train the received second neural network model based on the generated training data.

The at least one processor may be further configured to execute the at least one instruction to: obtain one or more input values to cause the first neural network model to output a specific output value and train the received second neural network model based on the one or more input value.

The at least one processor may be further configured to execute the at least one instruction to: obtain first output data by inputting first input data to the first neural network model, and obtain second output data by inputting the first input data to the second neural network model; based on the first output data and the second output data being different, store the first input data and the first output data in the at least one memory; and train the second neural network model based on the first input data and the first output data stored in the at least one memory.

The at least one processor is further configured to execute the at least one instruction to: while input data for using the second neural network model not being input, train the second neural network model based on the generated training data.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 1 is a diagram briefly illustrating a process of applying a personalized neural network model (personalized model) stored in an electronic apparatus to the other electronic apparatus according to an embodiment;

FIG. 2A is a diagram illustrating an embodiment of apparatuses associated with applying a personalized model when a version of a model stored in an electronic apparatus is the same as a version of a model stored in the other electronic apparatus;

FIG. 8 is a sequence diagram illustrating another example of an operation of apparatuses before applying a personalized model;

FIG. 11 is a diagram briefly illustrating an example of the electronic apparatus for applying the personalized model to a newly-received model according to an embodiment;

DETAILED DESCRIPTION

Figure 2B:
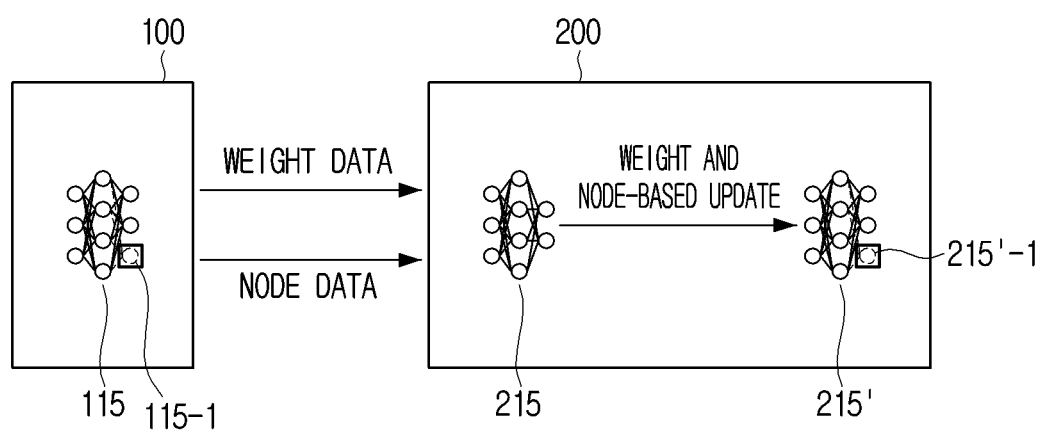
FIG. 2B is a diagram illustrating an embodiment of apparatuses associated with applying a personalized model when a version of a model stored in an electronic apparatus is the same as a version of a model stored in the other electronic apparatus.

Embodiments of the disclosure provide one or more electronic apparatuses to effectively apply a personalized neural network model to another non-personalized neural network model.

Further, embodiments of the disclosure provide an electronic apparatus to effectively apply a personalized neural network model to a new neural network model if a new neural network model to replace a personalized neural network model is received.

Before describing the disclosure in detail, an overview for understanding the present disclosure and drawings will be provided.

The terms used in the present disclosure and the claims are general terms identified in consideration of the functions of the various example embodiments of the disclosure. However, these terms may vary depending on intention, legal or technical interpretation, emergence of new technologies, and the like of those skilled in the related art. Also, some arbitrary terms may be used. Unless there is a specific definition of a term, the term may be understood based on the overall contents and technological common sense of those skilled in the related art.

Further, like reference numerals indicate like components that perform substantially the same functions throughout the disclosure. For convenience of descriptions and understanding, the same reference numerals or symbols are used and described in different example embodiments. In other words, although elements having the same reference numerals are all illustrated in a plurality of drawings, the plurality of drawings do not refer to one embodiment.

The terms such as "first," "second," and so on may be used to describe a variety of elements, but the elements should not be limited by these terms. The terms are used for the purpose of distinguishing one element from another. For example, the elements associated with the ordinal numbers should not be limited in order or order of use by the numbers. If necessary, the ordinal numbers may be replaced with each other.

A singular expression includes a plural expression, unless otherwise specified. It is to be understood that the terms such as "comprise" or "consist of" may, for example, be used to designate a presence of a characteristic, number, step, operation, element, component, or a combination thereof, and not to preclude a presence or a possibility of adding one or more of other characteristics, numbers, steps, operations, elements, components or a combination thereof The term such as "module," "unit," "part", and so on may refer, for example, to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

When any part is connected to another part, this includes a direct connection and an indirect connection through another medium. Further, when a certain part includes a certain element, unless specified to the contrary, another element may be additionally included, rather than precluding another element.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

In this disclosure, applying a personalized or customized neural network model to another neural network model or the like means that the performance of a training or update performed in the last personalization process of the personalized model may be reflected in other models as well. There are various schemes for application of a personalized model, and the schemes will be described with reference to various embodiments.

FIG. 1 is a diagram briefly illustrating a process of applying a personalized or customized neural network model (personalized model or customized model) stored in an electronic apparatus to the other electronic apparatus according to an embodiment.

The neural network model may include one or more nodes or one or more layers for defining a relationship between an input value and an output value. In the training process of the neural network model, the relationship between the nodes (for example, weight) or the relationship between layers may vary.

In FIG. 1, a personalized artificial intelligence (AI) model 11 is stored in a first electronic apparatus 100 and a non-personalized AI model 12 is stored in a second electronic apparatus 200.

Each of the first electronic apparatus 100 and the second electronic apparatus 200 may be apparatuses of the same type or different types. Each of the first electronic apparatus 100 and the second electronic apparatus 200 may correspond to various user devices such as a smartphone, a television (TV), a tablet personal computer (PC), a desktop PC, a notebook PC, or the like, but is not limited thereto.

The first electronic apparatus 100 and the second electronic apparatus 200 may be the apparatuses of the same user or may be apparatuses of different users.

The personalized model 11 may be a personalized model for a user as a result of training or updated result based on user input to the first electronic apparatus 100 or personal information of the user stored in the first electronic apparatus 100, or the like. Specifically, if the model 11 is a neural network model, the first electronic apparatus 100 may change the weight among nodes of the model 11 or the node configuration, an activation function of each of the nodes, or the like, of the model 11, based on user input or personal information of the user to personalize the model 11.

The first electronic apparatus 100 and the second electronic apparatus 200 may apply the model 11 stored in the first electronic apparatus 100 to the model 12 stored in the second electronic apparatus 200 based on the user input received in at least one of the first electronic apparatus 100 and the second electronic apparatus 200. This will be described with reference to FIG. 1.

Referring to FIG. 1, the first electronic apparatus 100 may compare structures of the models 11 and 12 in operation S51. If the models 11 and 12 are neural network models, the structures may refer, for example, to layer structures or internal node configurations, or the like, and FIG. 1 assumes that the models 11 and 12 are neural network models.

The first electronic apparatus 100 may receive information about the model 12 from the second electronic apparatus 200 and compare the structure of the model 11 and the model 12 based on the received information about the model 12. The information about the model 12 may include information about the layer structure, internal node configuration, or the like, of the model 12.

The information about the model 12 may include information on a version of the model 12. If versions of models are consistent with each other, layer structures of models may be identical.

The step of S51 may be performed by the second electronic apparatus 200, not by the first electronic apparatus 100. A relevant embodiment will be further described in FIG. 8.

If the structures between the two models 11 and 12 are consistent in operation S52-Y, the first electronic apparatus 100 may transmit information on the weight of the personalized model 11 in operation S53. Alternatively, if the versions between the two models 11 and 12 are consistent, the first electronic apparatus 100 may transmit information about the weight of the personalized model 11.

The second electronic apparatus 200 may update the model 12 by changing the inter-node weight of the model 120 based on the received information about the weight in operation S54. This corresponds to a first scheme to apply (or transition) the personalized model 11 to the model 12. The first scheme will be described in more detail below with reference to FIGS. 2A and 2B.

If the structures between the two models 11 and 12 are not consistent in operation S52-N, the first electronic apparatus 100 may identify whether the training data is already stored in the first electronic apparatus 100 in operation S55. Here, the training data may be the data used to train the model 11 in the previous personalization process of the personalized model 11. The training data may be defined according to a type of input and output data of the neural network model 11 (and the neural network model 12), and may include user input received at the first electronic apparatus 100, personal information of the user, sensing data received from various sensors, or the like.

If the training data is prestored in operation S55-Y, the first electronic apparatus 100 may transmit the training data to the second electronic apparatus 200 in operation S56. As a result, the second electronic apparatus 200 may train the model 12 through the received training data in operation S57. This is a second scheme for applying the personalized model 11 to the model 12. The second scheme will be further described with reference to FIG. 3.

When the training data is not prestored in operation S55-N, the first electronic apparatus 100 may transmit the personalized model 11 itself to the second electronic apparatus 200 in operation S58.

The second electronic apparatus 200 may generate the training data inversely using the received model 11 in operation S59. The second electronic apparatus 200 may train the model 12 using the generated training data. This is a third scheme to apply the personalized model 11 to the model 12. The third scheme will be further described with reference to FIG. 4.

The second electronic apparatus 200 may obtain output data from the received model 11 and the model 12, respectively, by inputting the input data to the received model 11 and the model 12 respectively. The second electronic apparatus 200 may identify whether there is an output difference between the models 11 and 12 in operation S60.

If there is an output difference, the second electronic apparatus 200 may identify output data of the model 11, which has a difference from the output data of the model 12 with respect to the same input data, as training data, and train the model 12 based on the training data in operations S59 and S57. This corresponds to a fourth scheme to apply the personalized model 11 to the model 12. The fourth scheme will be described in more detail below with reference to FIG. 5.

It is not necessary that only one of the four schemes is used. In particular, the second scheme (S56-S57), the third scheme (S58-S59-S57) and the fourth scheme (S58-S60-S59-S57) are not contradictory to each other and thus, at least two schemes may be performed together, unlike FIG. 1.

Operations of the first and the second electronic apparatuses 100 and 200 will be further described with reference to the drawings.

In FIGS. 2A, 2B, 3, 4, and 5, a personalized model 115 is stored in the first electronic apparatus 100 and a non-personalized model 215 is stored in the second electronic apparatus 200.

FIGS. 2A and 2B further illustrate the first scheme described above for applying a personalized model, wherein when the model stored in one electronic device and the model stored in another electronic device are the same version, that is, it is assumed that the layer structures of the model 115 and the model 215 are consistent with each other.

Referring to FIG. 2A, the first electronic apparatus 100 may transmit the information on the weight between nodes of the personalized model 115 to the second electronic apparatus 200.

In this example, the first electronic apparatus 100 may transmit information on all of the weights forming the model 115 or information about a part of the weights.

The first electronic apparatus 100 may transmit, to the second electronic apparatus 200, only information on the changed weight, among the weights of the model 115, in the personalization process.

For example, if the model 115 is configured to be a convolutional layer and one or more independent fully-connected layer as classifiers, and only the weight of the fully-connected layer is changed in the personalization process performed by the first electronic apparatus 100, the first electronic apparatus 100 may transmit only the information on the weight of the fully-connected layer to the second electronic apparatus 200.

It is possible to transmit to the second electronic apparatus 200 only the information on the weight, among the weights of the fully-connected layer, changed in the personalization process.

The electronic apparatus may identify a difference between the weights of the model 115 before the personalization process and the weights of the model 115 after the personalization process, and transmit the information on the identified difference to the second electronic apparatus 200.

The second electronic apparatus 200 may update the weight between nodes of the model 215 based on the information on the weight received from the first electronic apparatus 100.

The second electronic apparatus 200 may change weights, among the weights between nodes of the model 215, in a position corresponding to the weights of the model 115 in terms of a layer structure to suit to the weights of the model 115. As a result, the second electronic apparatus 200 may obtain a personalized model 215'.

For example, the model 215 may include a first layer having nodes n11-$n$13, a second layer having nodes n21-$n$23, and a third layer having nodes n31-$n$32. Each of the nodes n11-$n$13, n21-$n$23, and n31-32 has its own activation function f11-$f$13, f21-$f$23, and f31-$f$32. The node n21 in the second layer may be connected to the nodes n11, n12, and n13 in the first layer. The node n21 may receive inputs X1, X2, and X3 from the nodes n11, n12, and n13 and may obtain an output Y1 using the activation function f21. In particular, the node n21 may apply weights w1, w2, and w3 to values X1, X2, and X3 which are provide from the nodes n11, n12, and n13, respectively, to obtain the output Y1. Upon the weight-based update being performed, the weights w1, w2, and w3 may be updated to the weights w1', w2', and w3' as shown in the model 215'. Also, bias b of the activation function f21 may be updated to b'. Here, the updated weights w1', w2', and w3' and the update bias b' may have the same values as or different values from the weights w1, w2, and w3 and the bias b.

FIG. 2B assumes that the node configuration itself included in the model 115 has changed as well as the weight between nodes of the model 115 has changed during the personalization process. Specifically, a new node 115-1 may be added to the output terminal of the model 115 in the personalization process.

For example, the model 115 may be a classifier that was able to identify only people and animals from the image prior to personalization, to which a class (which could be implemented as an output terminal node) for identifying plants in addition to humans and animals, in accordance with a user's request, feedback, or the like, is added in the personalization process.

In this example, the first electronic apparatus 100 may transmit information on the added node 115-1 as well as information about the weights between noes to the second electronic apparatus 200. The information about the added node 115-1 may be information about the location or order of the node 115-1 on the layer structure in the model 115.

In this example, the information on the weight between nodes may include information on the weight associated with the added node 115-1.

The second electronic apparatus 200 may add a node 215'-1 corresponding to the node 115-1 to the model 215 based on the information on the added node 115-1 received from the first electronic apparatus 100.

The second electronic apparatus 200 may update all the weights of the model 215 to which the node 215'-1 is added based on the received information on the weight to obtain the personalized model 215'.

Additionally, the model 215 which has a fully-connected neural network (FCNN) may be updated to the model 215' which has a partially connected neural network (PCNN). The PCNN may contain only a sub-set of the entire set of possible connections for the network model.

Figure 2C:
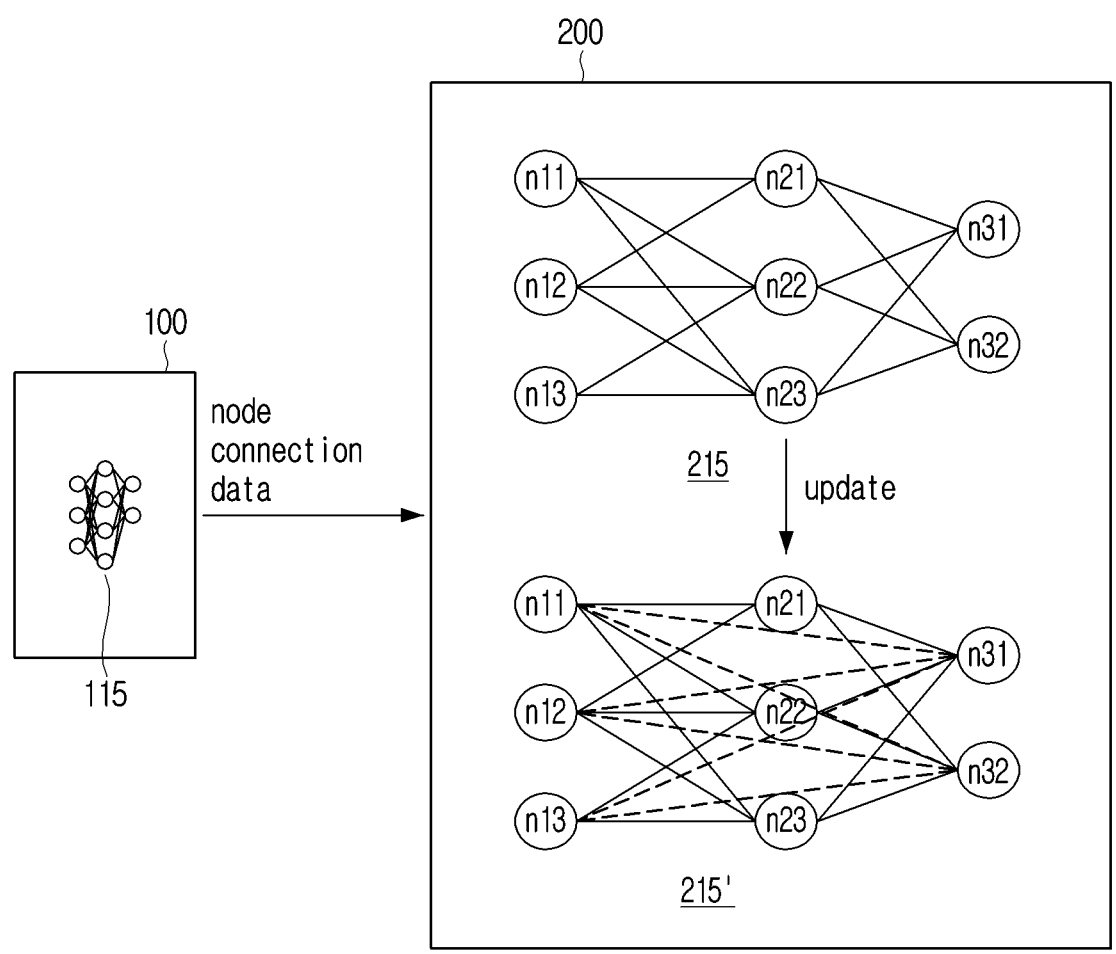
FIG. 2C is a diagram illustrating an embodiment of apparatuses associated with updating a neural network model based on node connection data indicating how the nodes of another neural network model are connected to each other.

FIG. 2C is a diagram illustrating an embodiment of apparatuses associated with updating a neural network model based on node connection data that indicates how the nodes of another network model are connected to each other.

As shown in FIG. 2C the second electronic apparatus 200 may receive node connection data from the first electronic device 100, and may update the model 215 to the model 215' based on the node connection data so that the update model 215' has a dense convolutional network, in which each layer is connected to every other layer in a feed-forward fashion. Unlike the neural network of the model 215 having connections between each layer and its subsequent layer, each layer of the neural network of the model 215' may use the inputs from all preceding layers. Specifically, for each layer, feature-maps of all preceding layers of the model 215' are used as inputs, and its own feature-maps are used as inputs into all subsequent layers.

Figure 3:
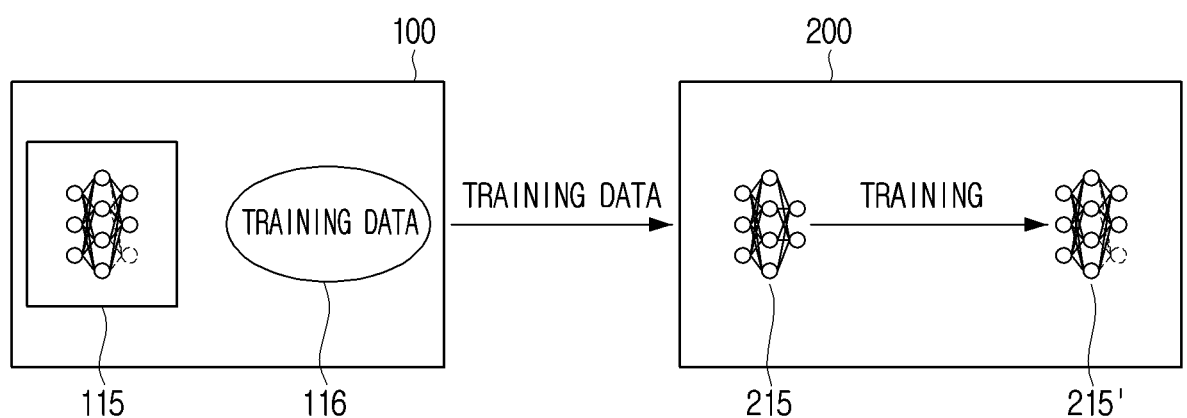
FIG. 3 is a diagram illustrating an embodiment of apparatuses for a process of applying a personalized model if there is prestored training data.

FIG. 3 is a diagram illustrating embodiments of apparatuses for an application process of a personalized model if there is pre-stored training data. The presence of pre-stored training data may refer, for example, to simple presence of pre-stored training data, though it is not much, but may refer, for example, to presence of the amount of pre-stored training data being helpful to personalization of the model 215, that is, above a predetermined threshold.

FIG. 3 is a more detailed illustration of the second scheme described above for applying a personalized model. In FIG. 1, it is assumed that the versions between models are different, but if the first scheme is not used, the present approach may be used even if the models between models are consistent with each other.

Referring to FIG. 3, the first electronic apparatus 100 may store training data 116 used in the personalization process of the model 115. In this example, the first electronic apparatus 100 may transmit the training data 116 to the second electronic apparatus 200.

If the training data 116 includes personal information about the user's identity or body, the first electronic apparatus 100 may transmit the training data 116 to the second electronic apparatus 200 only if the user input that accepts the transmission of personal information is received via the user input or the like.

If the training data 116 is transmitted, the second electronic apparatus 200 may obtain the personalized model 215' by training the model 215 based on the received training data 116.

Figure 4:
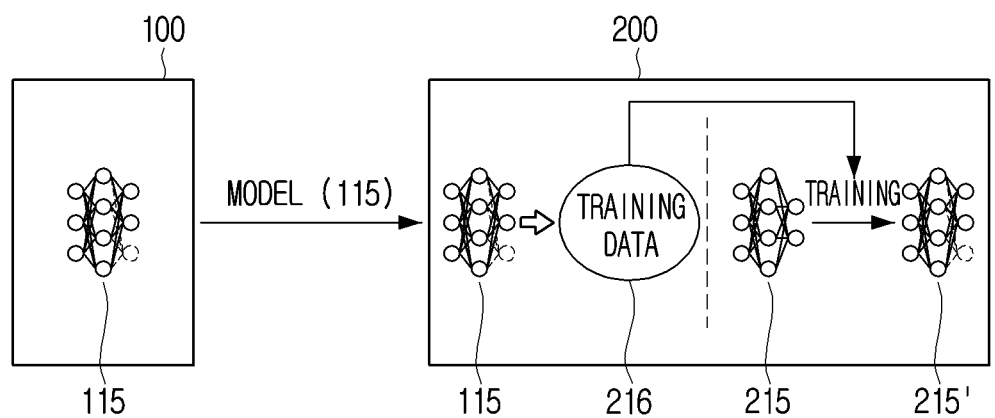
FIG. 4 is a diagram illustrating an embodiment of apparatuses for a process of applying a personalized model if there is no prestored training data.
Figure 5:
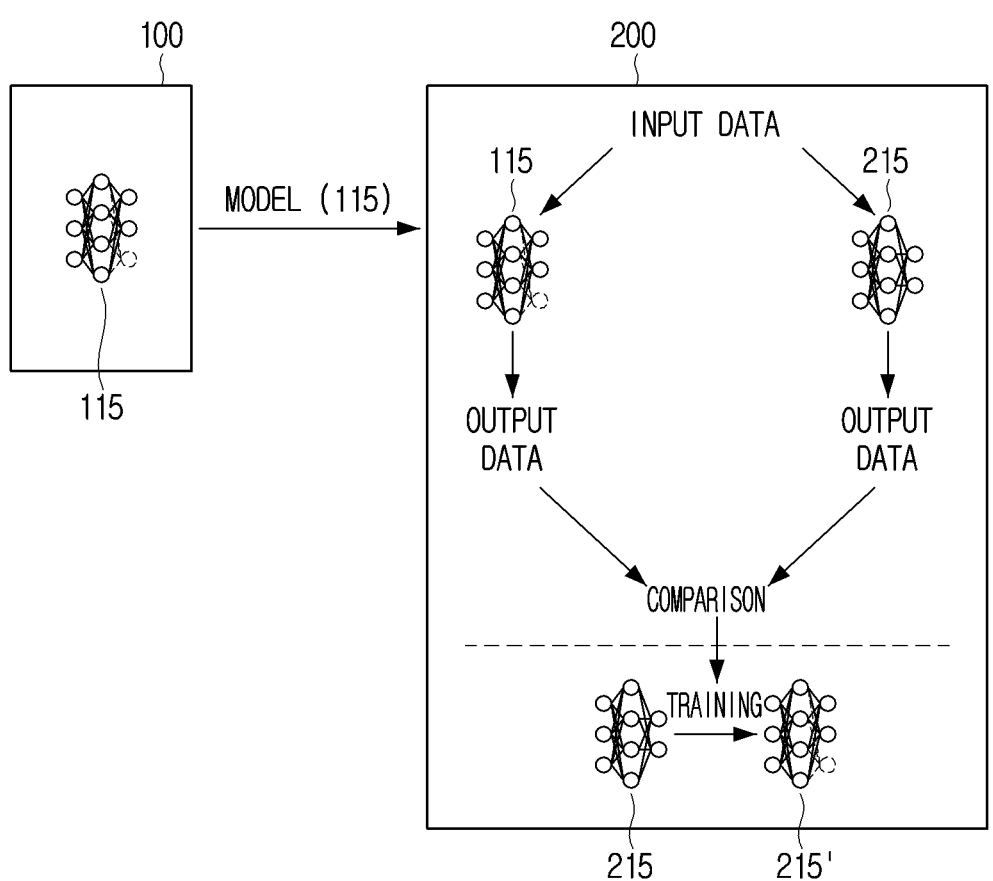
FIG. 5 is a diagram illustrating an embodiment of apparatuses for a process of applying a personalized model if there is no prestored training data.

FIGS. 4 and 5 are diagrams illustrating embodiments of apparatuses for a process of applying a personalized model if there is no prestored training data.

Referring to FIG. 4, the first electronic apparatus 100 may transmit the model 115 to the second electronic apparatus 200.

In this example, the second electronic apparatus 200 may generate the training data inversely from the model 115. For example, the second electronic apparatus 200 may obtain one or more input values to cause the personalized model 115 to output a specific output value.

Based on a specific output value of the personalized model 115, an objective function may be obtained, and one or more input values may be obtained based on the objective function.

The specific output value may be any one of the output value which the output data output by the model 115 may include.

The objective function may be defined as a function to find an input value that causes a specific output value to be output from the model 115. The objective function may be a function that includes an output value that is a result input to the model 115 and a specific output value. The objective function may indicate the relationship between the output value and the result of inputting (arbitrary) input value to the neural network model.

The predetermined condition may include a condition where the value of the objective function is the minimum or maximum. This may be to obtain an input value of a point where the value of the objective function, which is the result of changing the input values and applying the values sequentially to the objective function, is the minimum/maximum.

For example, the objective function may be "L(x)=|M(x)−y|", and the predetermined condition may be that L(x) is a minimum value. In this example, x is an input value, M(x) is a resultant output value by inputting the input value to the model 115, and y is a specific output value.

In this example, the second electronic apparatus 200 may compare sequential values (L(x1), L(x2), L(x3), . . . ) of the input values (x1, x2, x3, . . . ) which are gradually changing, to identify an input value in which the value of the objective function becomes the minimum. Alternatively, the second electronic apparatus 200 may use first-order or higher differential values of the value of the objective function for the gradually changing input value to obtain the input value at which the value of the objective function (: L(x)) becomes a minimum value.

The second electronic apparatus 200 may obtain a plurality of input values satisfying a predetermined condition by changing an input value until the objective function for a specific output value satisfies a predetermined condition for each of a plurality of random input values.

The second electronic apparatus 200 may obtain a plurality of objective functions for each of a plurality of specific output values of the model 115 and obtain a plurality of input values that satisfy a predetermined condition of each of the plurality of objective functions.

The second electronic apparatus 200 may obtain a plurality of input values (e.g., M) for each of the plurality of specific output values (e.g., N). In this example, the input value of N*M may be obtained.

The second electronic apparatus 200 may generate training data including the specific output values described above and the obtained one or more input values. The generated training data may include one or more pairs of training data. Each of the one or more pairs of training data may be configured with the obtained one input value and a specific output value for the corresponding input value.

The second electronic apparatus 200 may train the model 215 based on the generated training data.

In FIG. 5, the first electronic apparatus 100 may transmit the model 115 itself to the second electronic apparatus 200.

In this example, the second electronic apparatus 200 may input the input data to the model 115 as well, if the model 215 is used during the operation of the second electronic apparatus 200, that is, the input data is input to the model 215.

The output data of the models 115 and 215 may be compared with each other.

If there is a difference between the output data of the model 115 and the output data of the model 215, the second electronic apparatus 200 may store the output data and the input data of the model 115 having a difference.

The model 215 may be trained based on the training data including the stored input data and the output data. As a result, the personalized model 215' may be obtained.

If the stored input data and the training data exceed a predetermined amount of data, the model 215 may be trained using the stored input data and the training data. As described above, by performing training after a sufficient amount of training data has been collected, the temporal efficiency and accuracy of the training may be ensured.

As a specific example, it is assumed that the first electronic apparatus 100 is an old version cleaning robot and the second electronic apparatus 200 is a new version cleaning robot, and the model 115 and model 215 are each an image-based object recognition model. In this example, the model 215 is a model of which overall performance is updated as compared to the model 115, but is not personalized as the model 115.

For example, it may be assumed that a new class (e.g., a new type object is assumed to be "dog" and "cat") is added to the model 115 while the model 115 is personalized through the first electronic apparatus 100. In this example, the new class, that is, "dog" or "cat" may not be classified (identified) by the non-personalized model 215.

According to the fourth transmission scheme described above, the personalized model 115 may be transmitted from the first electronic apparatus 100 to the second electronic apparatus 200. The second electronic apparatus 200 may input an image that is input in real time through a camera in a driving and cleaning process to the received model 115 as well as the model 215.

If an identification result for "dog" or "cat" that may not be identified by the model 115 through the model 215 is output, the second electronic apparatus 200 may obtain the input data (e.g., image) and the output data (e.g., "dog" or "cat," or the probability value of presence of "dog/cat", or the like) as training data and store the training data in a memory.

The second electronic apparatus 200 may add a node associated with the new class ("dog", "cat") identified by the model 115 to the model 215. In addition, if the stored training data is sufficiently accumulated to be used for personalization of the model 215 (e.g., above a predetermined amount of data), the model 215 may be trained based on the stored training data.

The second electronic apparatus 200 may train the model 215 based on the received/generated/stored training data through the above-described embodiments while the input data for using the model 215 is not input. As a specific example, if the second electronic apparatus 200 is a cleaning robot, the model 215 may be trained on a rest mode during which cleaning is not performed.

The second electronic apparatus 200 may train the model 215 while the second electronic apparatus 200 is being charged. In this example, a situation in which a calculation amount and power are not sufficient during performing training may be prevented.

While training of the model 215 is performed, the second electronic apparatus 200 may display a graphical user interface (UI) indicating that it is "training (learning) is on-going". If a user's manipulation of the second electronic apparatus 200 is started, the training may be stopped while storing information about the weight that was most accurate to the corresponding time point. In this example, if an application including the model 215 is executed, an operation according to the user input may be performed using the untrained existing model 215. If the user's manipulation is no longer input (e.g., for a threshold time or longer), the training may be resumed by re-loading the information about the stored weight. In this example, a graphical user interface (UI) for informing that the "training is on-going" may be displayed again.

If the training (personalization) of the model 215 is terminated, the second electronic apparatus 200 may inform a user that personalization of the model 215 based on the model 115 is completed.

Figure 6:
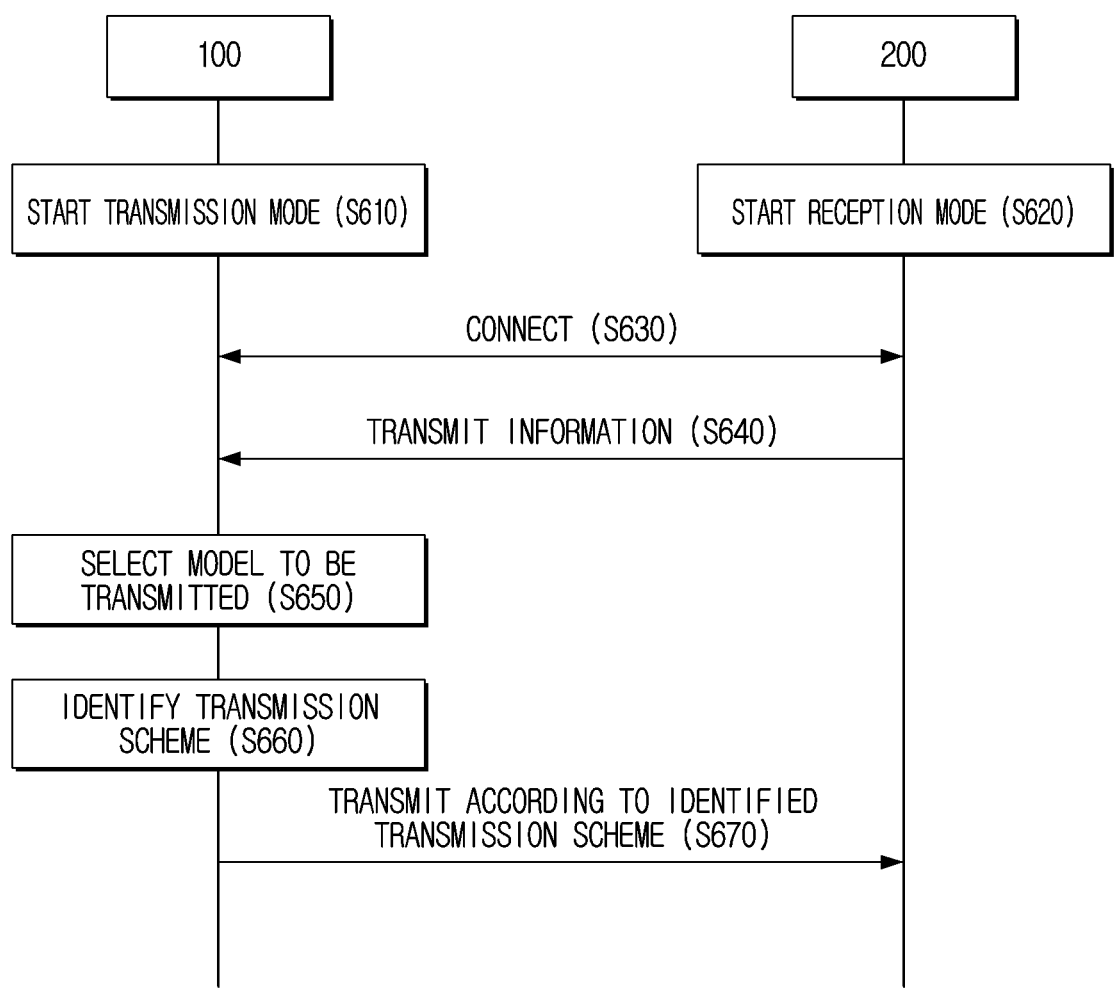
FIG. 6 is a sequence diagram illustrating an example of an operation of apparatuses before applying a personalized model.

FIG. 6 is a sequence diagram illustrating an example of an operation of apparatuses before applying a personalized model.

Referring to FIG. 6, the first electronic apparatus 100 may start a transmission mode in operation S610. In this example, the first electronic apparatus 100 may start the transmission mode according to the user input received in the first electronic apparatus 100. After the application for transmitting and receiving the AI model is executed according to the user input, the first electronic apparatus 100 may be designated as a transmitting device according to the user input so that the operating mode of the first electronic apparatus 100 may be switched to the transmission mode.

The second electronic apparatus 200 may start a reception mode in operation S620. The second electronic apparatus 200 may start the reception mode according to the user input received in the second electronic apparatus 200. In this example, after the application for transmitting and receiving the AI model is executed according to the user input, the second electronic apparatus 200 may be designated to a receiving apparatus according to the user input so that the operation mode of the second electronic apparatus 200 may be switched to the receiving mode.

The first electronic apparatus 100 and the second electronic apparatus 200 may be connected to each other using each communicator in operation S630. The electronic apparatuses 100 and 200 that start each of the transmission mode and the reception mode may search for each other on a wired and wireless communication network according to a user input.

According to an embodiment, the first electronic apparatus 100 and the second electronic apparatus 200 may additionally perform authentication between apparatuses based on an e-mail or an account (individual, family) to receive and transmit information related to the personalized AI model.

The first electronic apparatus 100 and the second electronic apparatus 200 may be directly connected by wire or connected by a wireless communication method such as direct WiFi, Bluetooth, or the like in operation S630.

When connected in wireless communication, a personalized model may be transmitted and received without going through a server or the like by using a communication method such as direct connect WiFi or Bluetooth. As a result, it is possible to prevent a situation where the personalized model is leaked to an external device or the like against the intention of a user.

After the first electronic apparatus 100 and the second electronic apparatus 200 are connected to each other, the second electronic apparatus 200 may transmit various information to the first electronic apparatus 100 in operation S640. In this example, on the condition that authentication for a user by the first electronic apparatus 100 is successful on the second electronic apparatus 200, the second electronic apparatus 200 may transmit various information to the first electronic apparatus 100.

The second electronic apparatus 200 may transmit, to the first electronic apparatus 100, information on one or more models stored in the second electronic apparatus 200 and information on the second electronic apparatus 200.

The information on the model may include information on a function of the model, information on the input and output data of the model, information on the version of the model, information on the layer structure of the model, information on the weight of the model, or the like.

The information on the second electronic apparatus 200 may include information on the memory capacity of the second electronic apparatus 200, information on the remaining memory capacity of the second electronic apparatus 200, information on the performance of the NPU or CPU of the second electronic apparatus 200, information on the type of the sensor included in the second electronic apparatus 200, or the like. If the personalized model being transmitted and received is an image-based object recognition model, the information about the second electronic apparatus 200 may also include information about the performance of a camera provided in the second electronic apparatus 200.

The first electronic apparatus 100 may select which model among one or more modes stored in the first electronic apparatus 100 is to be transmitted in operation S650. The model to be transmitted may be selected based on the user input received in the first electronic apparatus 100.

A transmission scheme of the selected model may be selected based on the selected model and the various information received from the second electronic apparatus 200 in operation S660 and transmission may be performed according to the selected transmission scheme in operation S670. In this example, on the condition that authentication for a user by the second electronic apparatus 200 is successful on the first electronic apparatus 100, the first electronic apparatus 100 may perform transmission in step S670.

The first electronic apparatus 100 may transmit, to the second electronic apparatus 200, information reflecting a personalization feature of the personalized model, in accordance with the selected transmission scheme. For example, the first electronic apparatus 100 may transmit at least one of information about the selected model (e.g, information about the weight), training data used for personalization of the selected model, and the selected model itself to the second electronic apparatus 200.

For example, if a model belonging to the same application/function same as the selected model is not stored in the second electronic apparatus 200, the first electronic apparatus 100 may transmit the selected model to the second electronic apparatus 200.

If a model belonging to the same application/function as the selected model is stored in the second electronic apparatus 200, if the selected model is a personalized model on the first electronic apparatus 100, the first electronic apparatus 100 may transmit at least one of information about the weight of the personalized model, the training data, and the personalized model to the second electronic apparatus 200.

The first electronic apparatus 100 may consider whether a version (or a layer structure) of the selected model and the model stored in the second electronic apparatus 200 is consistent, and whether the training data used for personalization of the selected model is stored in the first electronic apparatus 100, or the like. This has been described with reference to FIGS. 1 to 5.

Even if the model belonging to the same application/function as the selected model is stored in the second electronic apparatus 200, if the selected model is a non-personalized model, the first electronic apparatus 100 may transmit the selected model to the second electronic apparatus 200 only if the selected model is a higher version of the model than the model stored in the second electronic apparatus 200.

The first electronic apparatus 100 may select a transmission scheme based on user input. Specifically, the first electronic apparatus 100 may provide the user with information on a possible transmission scheme among the first to fourth schemes, and apply the model to the second electronic apparatus 200 according to a transmission scheme selected by a user input.

The first electronic apparatus 100 may transmit a weight of the selected model or at least a part of the selected model to the second electronic apparatus 200 and also transmit the information on the selected model to the second electronic apparatus 200 according to the selected transmission scheme as described above.

In this example, the information about the model may include information about the function of the model, information about input/output data of the model, information about the version of the model, information about the data size of the model, information about the layer structure of the model, information about the weight of the model, information about the personalization status of the model, information on the training data used for the personalization of the model (e.g., whether the training data is stored in the first electronic apparatus 100, the capacity of the training data, whether the training data includes personal information, or the like), information about the added class according to the personalization of the model (e.g., the name/type of an object (class) that may be additionally identified by the model according to personalization when the model is an object classifier, the order of the class in the output terminal, or the like).

Figure 7A:
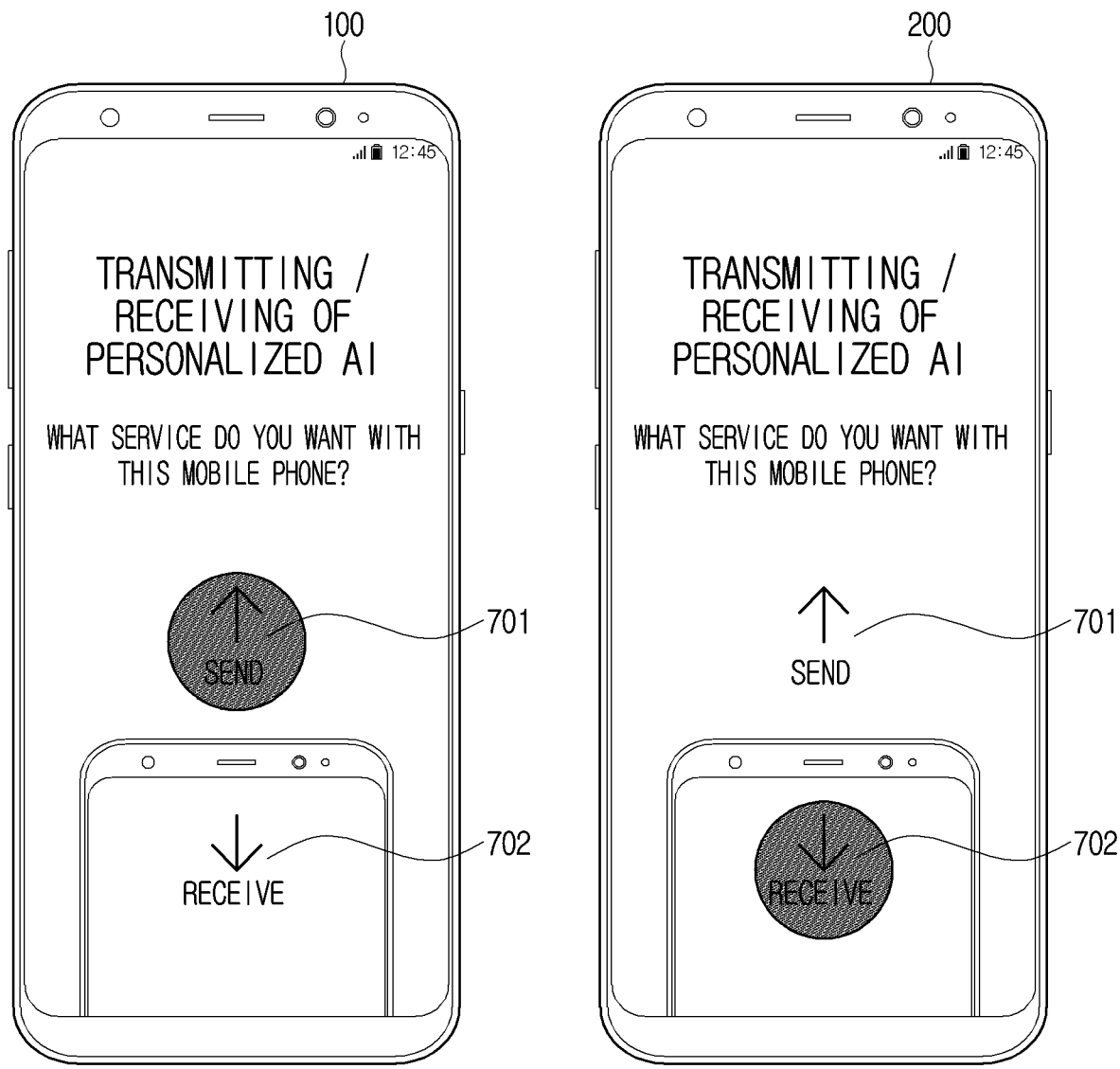
FIG. 7A is a view illustrating an example of providing a user interface (UI) provided by apparatuses to a user in the process of FIG. 6.
Figure 7B:
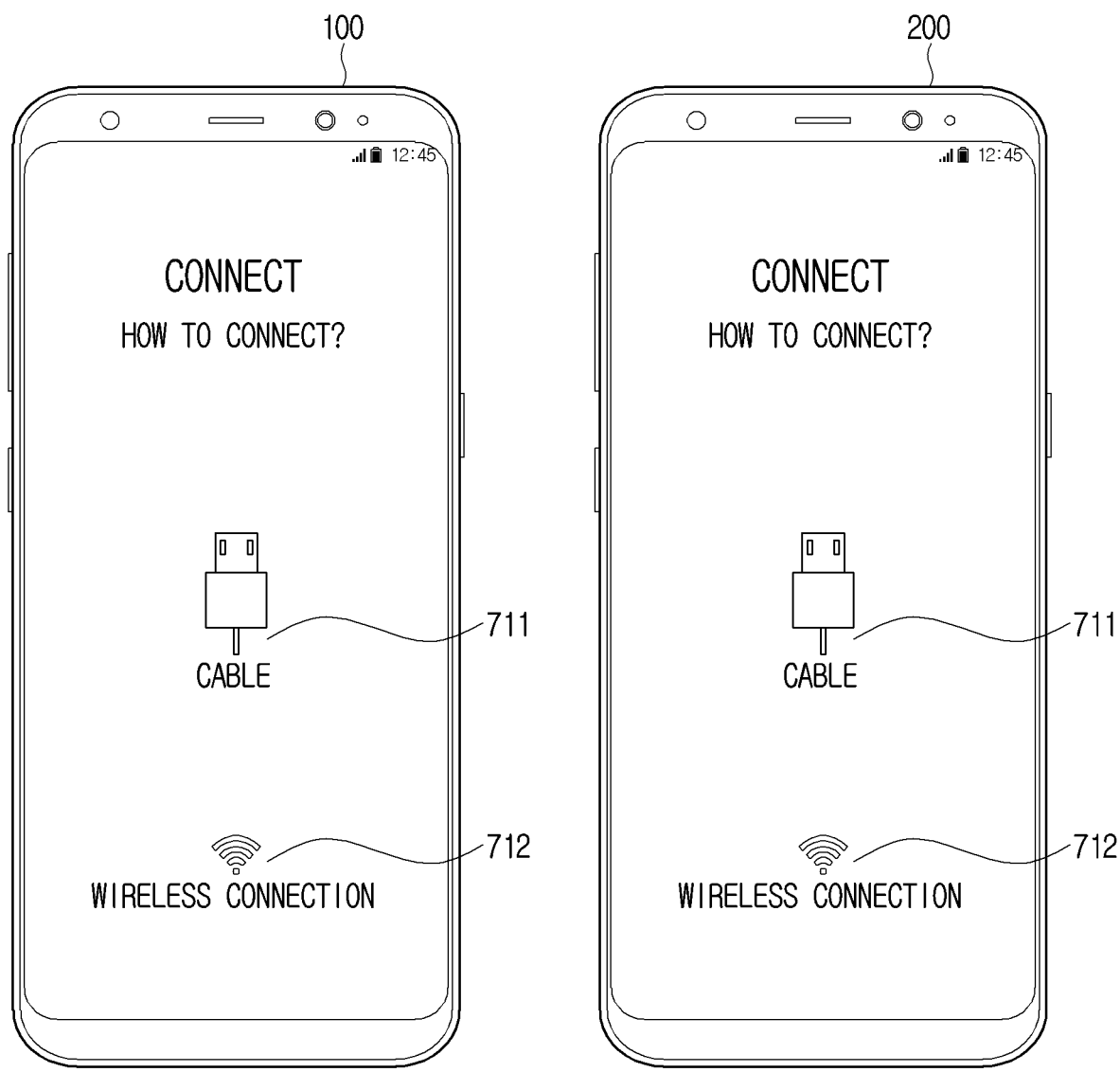
FIG. 7B is a view illustrating an example of providing a user interface (UI) provided by apparatuses to a user in the process of FIG. 6.

FIGS. 7A and 7B are views illustrating an example of providing a user interface (UI) provided by apparatuses to a user in the process of FIG. 6.

FIG. 7A is a diagram illustrating an example of starting a transmission mode and a reception mode by a user input, by the first electronic apparatus 100 and the second electronic apparatus 200 respectively. In FIG. 7A, it is assumed that an application for transmitting and receiving AI models is executed in the first electronic apparatus 100 and the second electronic apparatus 200, respectively, and an execution screen is displayed.

Referring to FIG. 7A, on an execution screen, a user may select "send" 701 or "receive" 702 by a touch, or the like.

Referring to FIG. 7A, the first electronic apparatus 100 in which "send" 701 is touched may start a transmission mode as the operation S610 of FIG. 6, and the second electronic apparatus 200 in which "receive" 702 is touched may start a reception mode as the operation S620 of FIG. 6.

FIG. 7B is a view illustrating an example of providing a user interface (UI) for selecting a connection method by electronic apparatuses 100 and 200 in relation to step S630 of FIG. 6.

Referring to FIG. 7B, each of the first electronic apparatus 100 and the second electronic apparatus 200 may display each item so as to select either a "cable" 711 for sending and receiving the AI model by wire and a "wireless connection" 712 for wirelessly transmitting and receiving the AI model.

If the "cable" 711 is selected, and a cable, or the like, connecting the first electronic apparatus 100 and the second electronic apparatus 200 is directly attached by the user, the first electronic apparatus 100 and the second electronic apparatus 200 may be connected to each other.

If the "wireless connection" 712 is selected, the first electronic apparatus 100 and the second electronic apparatus 200 may be connected by searching for each other via direct WiFi, Bluetooth communication, or the like.

Figure 7C:
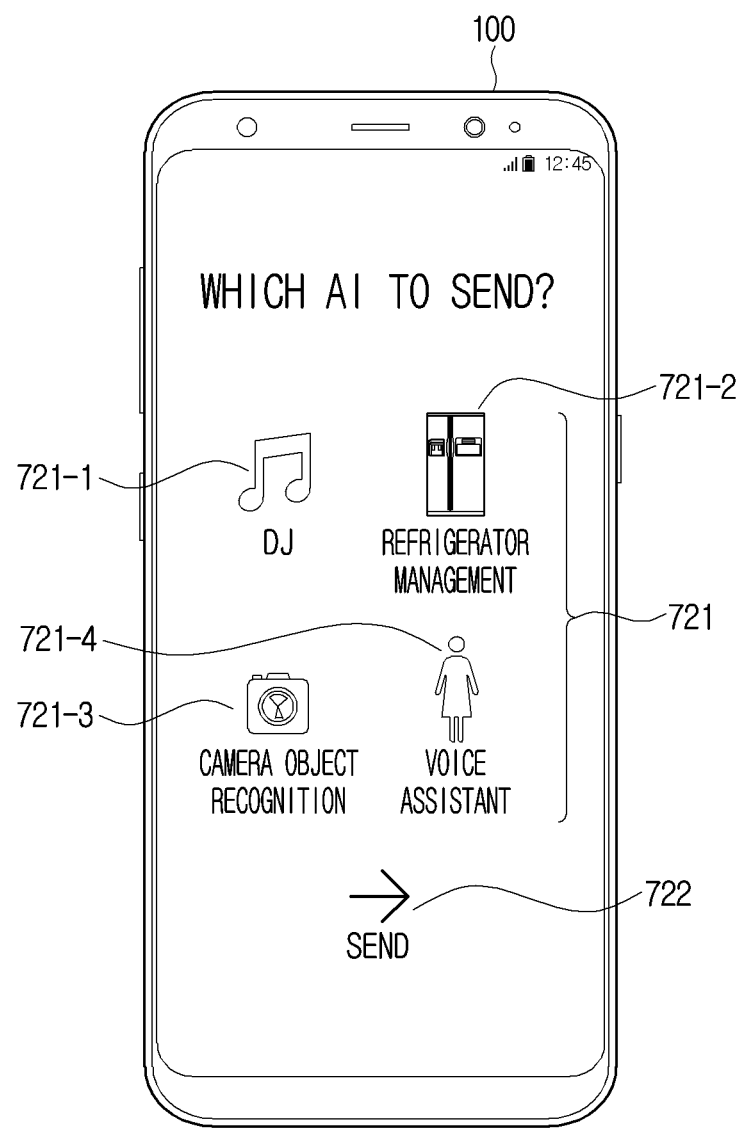
FIG. 7C is a view illustrating an example of providing a user interface (UI) provided by apparatuses to a user in the process of FIG. 6.

FIG. 7C is a view illustrating an example of providing a user interface (UI) for receiving a selection of a model to be transmitted to the second electronic apparatus 200 by the first electronic apparatus 100 with respect to S650 of FIG. 6.

Referring to FIG. 7C, the first electronic apparatus 100 may display a menu 721 representing models (or applications in which models are included, respectively) stored in the first electronic apparatus 100, such as "DJ" 721-1, "refrigerator management" 721-2, "camera object recognition" 721-3, "voice assistant" 721-4, or the like. If the "send" 722 is selected after at least one of the models is selected, the first electronic apparatus 100 may send the selected model, information about the weight of the selected model, or training data used for personalization of the selected model, or the like, to the second electronic apparatus 200.

Figure 7D:
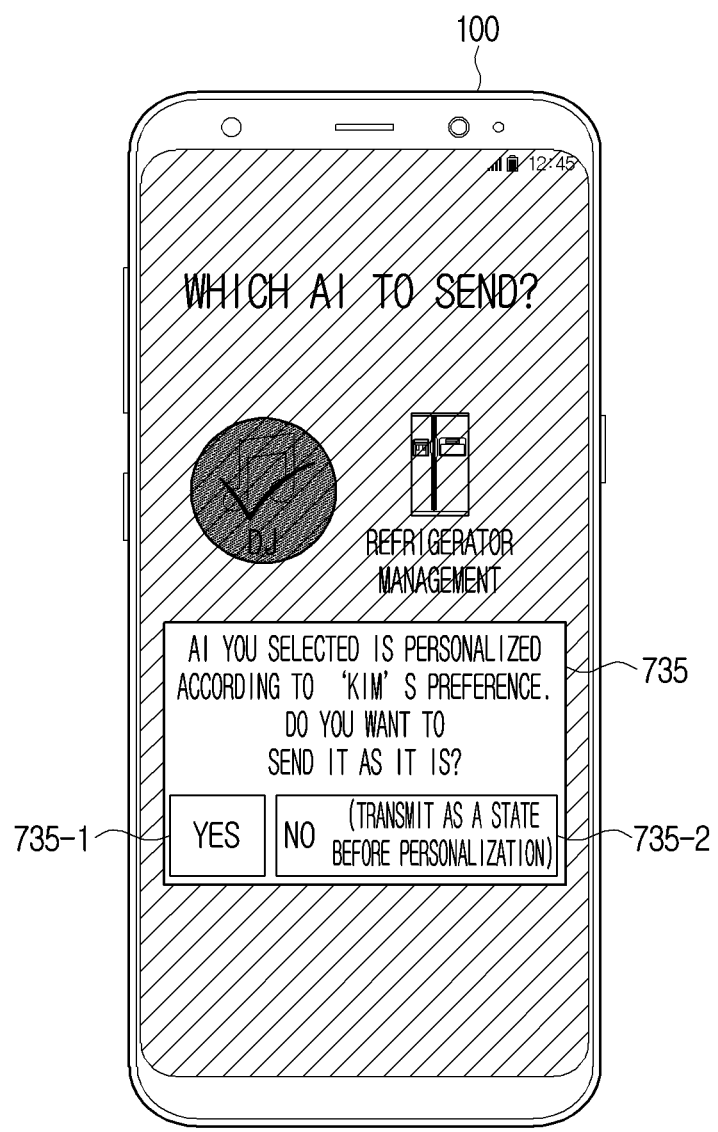
FIG. 7D is a view illustrating an example of providing a user interface (UI) provided by apparatuses to a user in the process of FIG. 6.

Referring to FIG. 7D, if the selected model is the personalized model, the first electronic apparatus 100 may request a user's confirmation prior to transmitting the personalized model.

Referring to FIG. 7D, the first electronic apparatus 100 may notify that the selected model "DJ" is in a personalized state according to a taste of a user (e.g., KIM) and display a UI 735 for selecting whether to transmit or not.

In this example, if the user selects "YES" 735-1, the model "DJ" personalized by the first electronic apparatus 100 may be applied to the second electronic apparatus 200. That is, the first electronic apparatus 100 may transmit at least a portion of the model "DJ" having a weight prior to personalization or training data to the second electronic apparatus 200.

In this example, the first electronic apparatus 100 may identify a transmission scheme using information received from the second electronic apparatus 200 and select a transmission scheme based on the user input.

If the user selects "NO" 735-2, the "DJ" which is a model in a non-personalized state may be applied to the second electronic apparatus 200.

The transmission scheme may be identified by the second electronic apparatus 200, unlike FIG. 6.

FIG. 8 is a sequence diagram illustrating another example of an operation of apparatuses before applying a personalized model.

Referring to FIG. 8, the first electronic apparatus 100 and the second electronic apparatus 200 may start the transmission mode and the reception mode, respectively, in operations S810 and S820, may be connected to each other in operation S830, and unlike FIG. 6, the first electronic apparatus 100 may transmit various information to the second electronic apparatus 200 in operation S840.

The first electronic apparatus 100 may transmit, to the second electronic apparatus 200, information on one or more models stored in the first electronic apparatus 100 and information on the first electronic apparatus 100.

The information about the model may include information about the function of the model, information about input/output data of the model, information about the version of the model, information about the data size of the model, information about the layer structure of the model, information about the weight of the model, information about the personalization status of the model, information on the training data used for the personalization of the model (e.g., whether the training data is stored in the first electronic apparatus 100, the capacity of the training data, whether the training data includes personal information, or the like), information about the added class according to the personalization of the model (e.g., the name/type of an object (class) that may be additionally identified by the model according to personalization when the model is an object classifier, the order of the added class among the classes that may be classified by the model, or the like).

The information about the first electronic apparatus 100 may include information on the performance of the NPU or the CPU of the second electronic apparatus 200, information on the type of the sensor included in the second electronic apparatus 200, or the like. If the personalized model being transmitted and received is an image-based object recognition model, the information about the second electronic apparatus 200 may also include information about the performance of the camera provided in the first electronic apparatus 100.

The second electronic apparatus 200 may select a model (or application) to be received from the first electronic apparatus 100 based on the information on one or more models stored in the first electronic apparatus 100, in operation S850. In this example, the second electronic apparatus 200 may select a model to be received based on the user input received in the second electronic apparatus 200.

The second electronic apparatus 200 may identify a transmission scheme for being applied with a model selected from the first electronic apparatus 100 on the basis of information on a selected model, information about a model stored in the second electronic apparatus 200, or the like in operation S860. The second electronic apparatus 200 may transmit information on the identified transmission scheme to the first electronic apparatus 100 in operation S870.

As a result, the second electronic apparatus 200 may receive information reflected by the personalization features of the personalized model from the first electronic apparatus 100 based on the identified transmission scheme in operation S880. That is, the second electronic apparatus 200 may receive information about the selected model (e.g., information about the weight), training data used for personalization of the selected model, and at least one of the selected models itself from the first electronic apparatus 100.

If a model belonging to the same application/function as the selected model is not stored in the second electronic apparatus 200, the second electronic apparatus 200 may transmit a request to transmit the selected model to the first electronic apparatus 100.

If a model belonging to the same application/function as the selected model is stored in the second electronic apparatus 200, if the selected model is a personalized model on the first electronic apparatus 100, the second electronic apparatus 200 may transmit a request to the first electronic apparatus 100 to transmit at least one of information about the weight of the personalized model, training data, and a personalized model.

The second electronic apparatus 200 may consider whether the selected model matches the version (or layer structure) of the model stored in the second electronic apparatus 200, whether the training data used for personalization of the selected model is stored in the first electronic apparatus 100, or the like. This is described with reference to FIGS. 1 through 5.

Even if the model belonging to the same application/function as the selected model is stored in the second electronic apparatus 200, if the selected model is not a personalized model, the second electronic apparatus 200 may transmit, to the first electronic apparatus 100, a request to transmit the selected model to the second electronic apparatus 200 only if the selected model has a higher version than the model stored in the second electronic apparatus 200.

The second electronic apparatus 200 may identify the transmission scheme according to a user input.

Figure 9A:
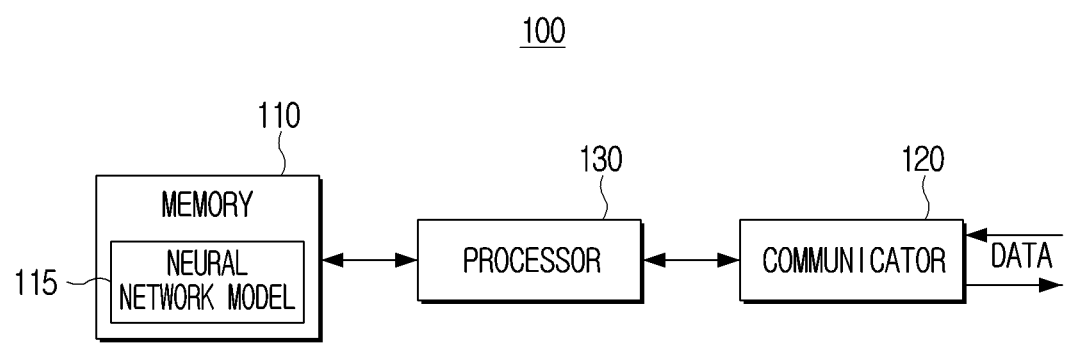
FIG. 9A is a block diagram illustrating a configuration of an electronic apparatus to apply a personalized neural network model to an external electronic device according to an embodiment.

FIG. 9A is a block diagram illustrating an essential configuration of the first electronic apparatus 100 according to various embodiments described above. Hereinbelow, the operations of the first electronic apparatus 100 will be described according to the various embodiments described above based on the components of the first electronic apparatus 100.

The first electronic apparatus 100 may include a memory 110, a communicator (e.g., a communication interface)120, and a processor 130.

The memory 110 is configured to store various data related to an operating system (OS) and the components of the first electronic apparatus 100 for controlling the overall operation of the components of the first electronic apparatus 100. The memory 110 may include at least one instruction associated with one or more components of the first electronic apparatus 100.

The memory 110 may be implemented as a non-volatile memory (e.g., hard disc, solid state drive (SSD), flash memory), volatile memory, or the like.

The memory 110 may store the neural network model 115.

The neural network model 115 may include a plurality of neural network layers. Each layer has a plurality of weight values, and performs a layer operation through a result of calculation of a previous layer and an operation of a plurality of weights. Examples of neural networks include, but are not limited to, a convolutional neural network (CNN), a deep neural network (DNN), a recurrent neural network (RNN), a Restricted Boltzmann Machine (RBM), a Deep Belief Network (DBN), a Bidirectional Recurrent Deep Neural Network (BRDNN), and a Deep Q-Networks, and the neural network in the disclosure is not limited to the above-described example, unless specified otherwise.

The neural network model 115 may be a model that is personalized through training and update based on the user's personal information or the user input received in the first electronic apparatus 100, or the like.

The communicator 120 is configured to perform communication by the first electronic apparatus 100 with at least one external device to transceive signal/data. For this purpose, the communicator 120 may include a circuitry.

The communicator 120 may include a wireless communication module, a wired communication module, or the like.

The wireless communication module may include at least one of a Wi-Fi communication module, a Direct Wi-Fi communication module, a Bluetooth module, an Infrared Data Association (IrDA) module, a third generation (3G) mobile communication module, a fourth generation (4G) mobile communication module, a fourth generation Long Term Evolution (LTE) communication module, for receiving content from an external server or an external device.

The wired communication module may be implemented as a wired port such as a Thunderbolt port, a universal serial bus (USB) port, or the like.

When connected to the second electronic apparatus 200 via wireless communication, the communicator 120 may use Direct WiFi communication module, Bluetooth module, infrared communication module, or the like.

The processor 130 controls overall operations of the first electronic apparatus 100. The processor 130 may be connected to the memory 110 and the communicator 120 to control the first electronic apparatus 100.

For this purpose, the processor 130 may include a central processing unit (CPU), a graphic processing unit (GPU), a neural processing unit (NPU), or the like, and may perform operations or data processing on the control of other components included in the first electronic apparatus 100.

The processor 130 may be implemented as a micro processing unit (MPU), or may correspond to a computer to which random access memory (RAM), read only memory (ROM), or the like is connected to the CPU, or the like, through a system bus.

The processor 130 may control one or more software modules included in the first electronic apparatus 100, as well as the hardware components included in the first electronic apparatus 100, and the result of the processor 130 controlling the software module may be derived as the operation of the hardware configurations.

The processor 130 may be configured with one or a plurality of processors. The one or more processors may then be a general purpose processor, such as a CPU, an AP, or the like, a graphics-only processor such as GPU, VPU, or an AI-only processor such as an NPU.

The one or a plurality of processors control the processing of the input data according to a predefined operating rule or an AI model stored in the memory. The predefined operating rule or AI model is made through learning.

Here, being made through learning may refer that a predetermined operating rule or an AI model with a desired feature is made by applying learning algorithm to a plurality of learning data. The learning may be performed in a device itself in which AI according to the disclosure is performed, and may be implemented through a separate server/system.

The learning algorithm is a method for training a predetermined target device (e.g., a robot) using a plurality of learning data to cause the predetermined target device to make a determination or prediction by itself. Examples of learning algorithms include supervised learning, unsupervised learning, semi-supervised learning, or reinforcement learning, and the learning algorithm in the disclosure is not limited to the examples described above except when specified.

The processor 130 may control operations of the first electronic apparatus 100 described through the various embodiments described above.

The processor 130 may receive information about a neural network model stored in the second electronic apparatus 200 from the second electronic apparatus 200 via the communicator 120. The processor 130 may control the communicator 120 to transmit information on the weight between nodes of the personalized neural network model 115 to the second electronic apparatus 200 based on the received information on the neural network model and information on the neural network model 115 stored (personalized) in the memory 110.

The processor 130 may identify whether the version of the neural network model 115 and the version of the neural network model stored in the second electronic apparatus 200 is the same as the version of the neural network model stored in the second electronic apparatus 200 based on the received information about the neural network model. When the version of the neural network model 115 and the version of the neural network model stored in the second electronic apparatus 200 are the same, the processor 130 may control the communicator 120 to transmit information on the weight between the nodes of the personalized neural network model 115 to the second electronic apparatus 200.

If a node added in the first electronic apparatus 100 is included in the personalized neural network model 115, the processor 130 may control the communicator 120 to transmit information on the added node and information on the weight between nodes of the personalized neural network model 115 to the second electronic apparatus 200.

The processor 130 may control the communicator 120 to transmit one of the neural network model 115 and the training data used to personalize the neural network model 115 to the second electronic apparatus 200 if the version of the neural network model 115 and the version of the neural network model stored in the second electronic apparatus 200 are not the same.

In this example, if the version of the neural network model 115 and the version of the neural network model stored in the second electronic apparatus 200 are different, the processor 130 may identify whether the training data used for training the neural network model 115 is stored in the memory 110.

If the training data is stored in the memory 110, the processor 130 may control the communicator 120 to transmit training data to the second electronic apparatus 200. If the training data is not stored in the memory 110, the processor 130 may control the communicator 120 to transmit the personalized neural network model 115 to the second electronic apparatus 200.

Figure 9B:
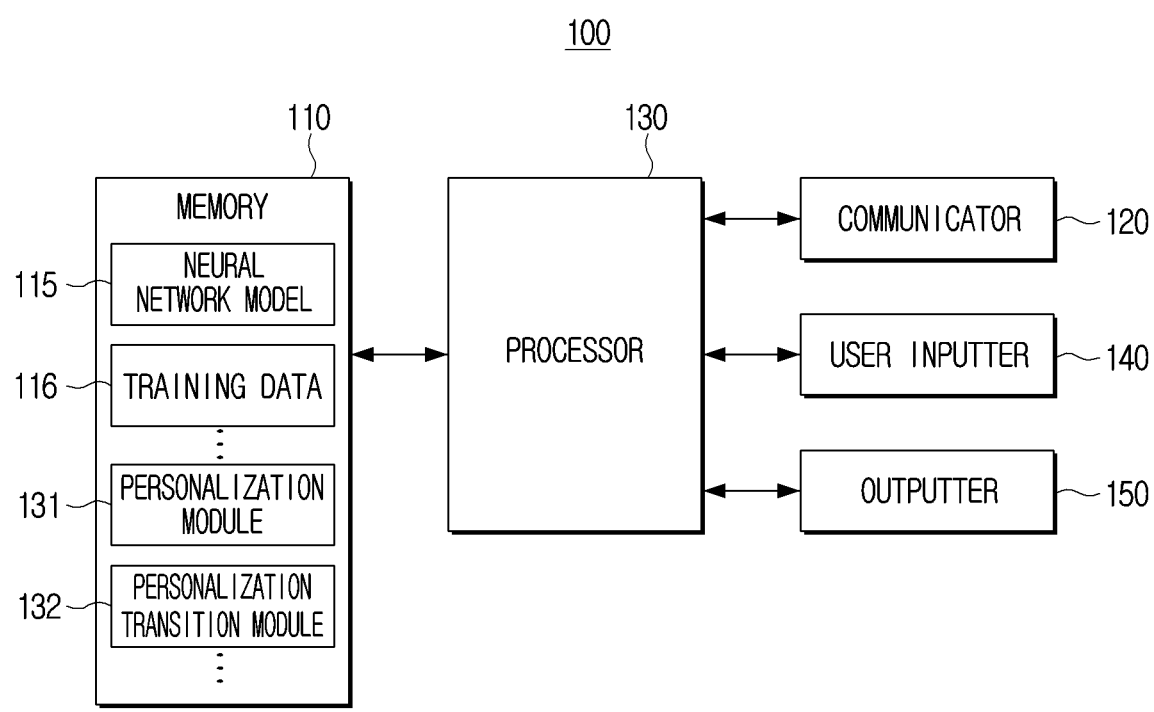
FIG. 9B is a block diagram illustrating a detailed configuration of the electronic apparatus of FIG. 9A.

FIG. 9B is a block diagram illustrating a detailed configuration of the electronic apparatus of FIG. 9A.

Referring to FIG. 9B, the first electronic apparatus 100 may further include a user inputter (e.g., a user input interface) 140 and an outputter (e.g., an output interface) 150, in addition to the memory 110, the communicator 120, and the processor 130.

Referring to FIG. 9B, the memory 110 may further include training data 116 in addition to the neural network model 115. The training data 116 is the data used for training the neural network model 115 in the process of the neural network model 115 being personalized on the first electronic apparatus 100.

The training data 116 may be defined according to the type of input/output data of the neural network model 115, and may be generated based on the user input received via the user inputter 140 or sensing data received through various sensors in the first electronic apparatus 100.

Referring to FIG. 9B, the processor 130 may control a personalization module 131 and a personalization transition module 132 stored in the memory 110. Each of the present modules may be stored in the memory 110 in a form of software as FIG. 9B, and may be selectively executed by the processor 130, or implemented as hardware, unlike FIG. 9, and may be controlled by the processor 130. Alternatively, each of the present modules may be in the form of a combination of software and hardware.

The personalization module 131 is a module for personalizing the neural network model 115. The personalization module 131 may train or update the personalization module 131 based on user input or various input data for the first electronic apparatus 100.

The personalization transition module 132 is a module to transmit at least a part of the personalized neural network model 115 or the training data 116 to an external electronic device (e.g., the second electronic apparatus 200).

The personalization transition module 132 may transmit at least a portion of the neural network model 115 and/or the training data 116 to the external electronic device based on a layer structure or version difference between the neural network model 115 and the neural network model stored in the external electronic device.

The user inputter 140 is configured to receive various user inputs such as a user command, input data (of a user), or the like.

According to a user command received via the user inputter 140, the processor 130 may operate the neural network model 115. In this example, the processor 130 may input the input data received through the user inputter 140 to the neural network model 115 and obtain the output of the neural network model 115.

The user inputter 140 may include one or more buttons, a keyboard, a mouse, or the like. The user inputter 140 may also include a touch panel or a separate touch pad (not shown) implemented with a display (not shown).

The user inputter 140 may include a microphone to receive a user command or input data as a speech or may include a camera for receiving the user command or input data as an image or a motion.

The outputter 150 is configured to provide various information included in the first electronic apparatus 100 to a user.

The processor 130 may provide a user with the output data output from the neural network model 115 and information related thereto through the outputter 150.

The processor 130 may also control the outputter 150 to provide a visual/auditory UI to receive a user command for operations related to use of the neural network model 115 and application of the neural network model 115, or the like. FIGS. 7A to 7D correspond to examples thereof.

The outputter 150 may include an audio outputter, a display, or the like. The audio outputter may be implemented as a speaker and/or audio/headphone terminal, or the like.

The first electronic apparatus 100 may include various types of sensors to receive various information about the user's life environment. Using the sensing data obtained through the sensor, the processor 130 may personalize the neural network model 115, and providing various services using the personalized neural network model 115.

Figure 10A:
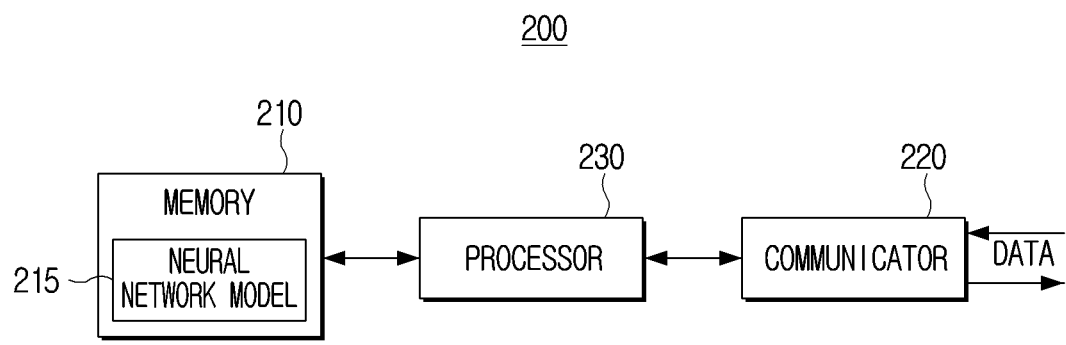
FIG. 10A is a block diagram illustrating a configuration of an electronic apparatus to be applied with a personalized neural network model from an external electronic device.

FIG. 10A is a block diagram illustrating a configuration of an electronic apparatus to be applied with a personalized neural network model from an external electronic device. Hereinafter, based on the components of the second electronic apparatus 200, operations of the second electronic apparatus 200 according to the various embodiments as described above will be described.

Referring to FIG. 10A, the second electronic apparatus 200 may include a memory 210, a communicator (e.g., a communication interface) 220, and a processor 230. The memory 210 may store a neural network model 215.

The processor 230 may be connected to the memory 110 and the communicator 120 and control the second electronic apparatus 200.

The processor 230 may receive information about the personalized neural network model 115 stored in the first electronic apparatus 100 from the first electronic apparatus 100 via the communicator 120. The processor 230 may update the neural network model 215 based on a difference between the personalized neural network model 115 and the neural network model 215.

If the information on the weight between nodes is received from the first electronic apparatus 100 through the communicator 220, the processor 230 may update the neural network model 215 based on the received weight between nodes.

If information on a node added to the personalized neural network model 115 and information on the weight between nodes of the personalized neural network model 115 are received through the communicator 220, the processor 230 may update the neural network model 215 based on information on the received node and information on the weight between nodes.

If the training data 116 used to personalize the personalized neural network model 115 is received through the communicator 220, the processor 230 may train the neural network model 215 based on the received training data.

If the personalized neural network model 115 is received via the communicator 220, the processor 230 may generate training data using the personalized neural network model 115 and train the neural network model 215 based on the generated training data. The processor 230 may train the neural network model 230 based on the generated training data while the input data for using the neural network model 215 is not being input.

The processor 230 may obtain one or more input value to cause the neural network model 115 to output a specific output value, and train the neural network model 215 based on the obtained one or more input value.

When the personalized neural network model 115 is received via the communicator 220, the processor 230 may input the first input data to the neural network model 115 to obtain the first output data, and input the first input data to the neural network model 215 to obtain the second output data.

If the first output data is different from the second output data, the first input data and the second output data may be stored in the memory 210, and the neural network model 215 may be trained based on the first input data and the first output data stored in the memory 210.

Figure 10B:
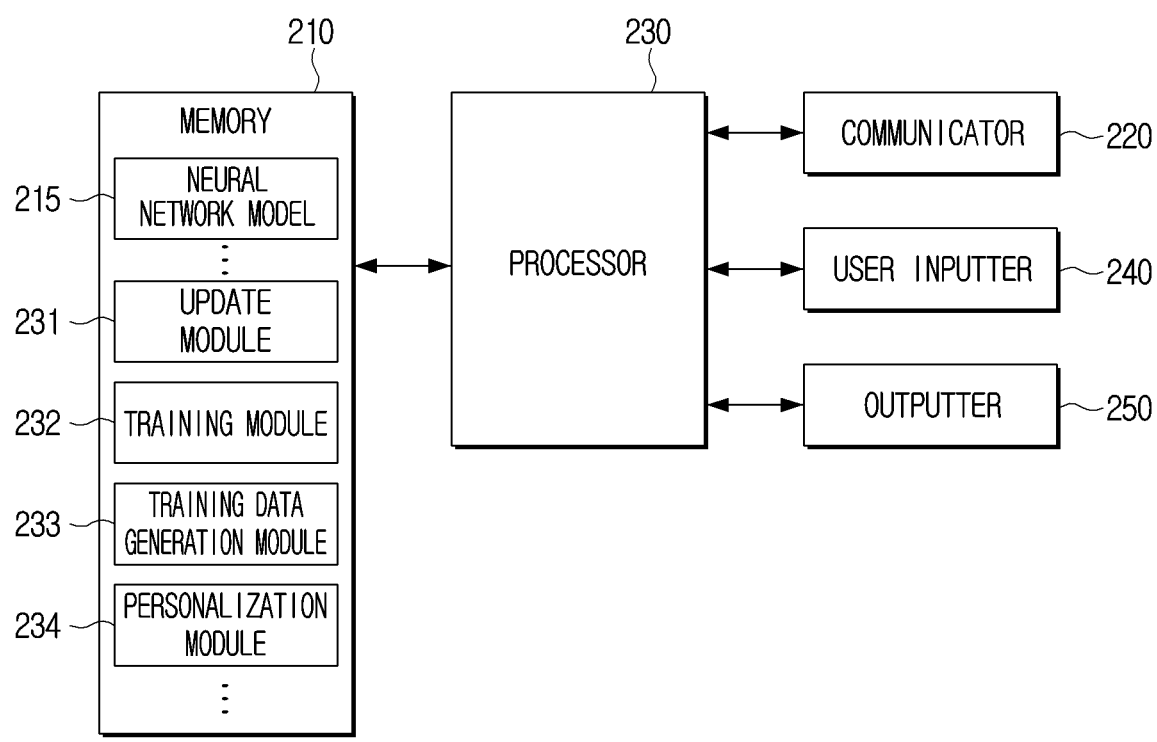
FIG. 10B is a block diagram illustrating an example of a more detailed configuration of the electronic apparatus of FIG. 10A.

FIG. 10B is a block diagram illustrating an example of a more detailed configuration of the electronic apparatus of FIG. 10A. Referring to FIG. 10B, the second electronic apparatus 200 may further include a user inputter (e.g., a user input interface) 240, an outputter (e.g., an output interface) 250, or the like, in addition to the memory 210, the communicator 220, and the processor 230.

Referring to FIG. 10B, the processor 230 may control an update module 231, a training module 232, a training data generation module 233, a personalization module 234, etc. stored in the memory 210. Each of the modules may be stored in the memory 210 in a software format and may be selectively executed by the processor 230, or implemented in a hardware format differently from FIG. 10B and controlled by the processor 230. Alternatively, each of the present modules may be in the form of a combination of software and hardware.

The update module 231 is a module that, when information on the weight or information on the added node is received from an external electronic device, updates the neural network model 215 based thereon.

The training module 231 is a module to train the neural network model 215 based on the training data received from an external electronic device or training data generated in the second electronic apparatus 200.

The training data generation module 233 is a module for training the neural network model 215. Specifically, the training data generation module 233 may generate training data including input data and output data from a model received from an external electronic device (e.g., the personalized neural network model 115). Alternatively, the training data may be generated based on an output difference for the same input data between the received model 115 and the neural network model 215.

The personalization module 234 is a module for personalizing the neural network model 215. Specifically, the personalization module 234 may update or train the personalization module 234 based on user input or various input data for the first electronic apparatus 100.

The configurations described above with reference to FIGS. 9A, 9B, 10A, 10B, etc., are results of the assumption that the first electronic apparatus 100 is a device for applying a personalized neural network model to another device, and that the second electronic apparatus 200 is a device for being applied with a personalized neural network model stored in another device.

The electronic apparatus according to the present disclosure may apply a personalized model stored in the electronic apparatus to another apparatus, or may be applied with a personalized model stored in another electronic apparatus, and thus, the configurations of each of the first electronic apparatus 100 and the second electronic apparatus 200 may all be included in one electronic apparatus. In this example, the memory 110 and the memory 210 need not be implemented as separate memories, but may be implemented as a single memory. This applies to other configurations as well.

The embodiments described above are directed to applying a personalized model stored in one electronic apparatus to a model stored in another electronic apparatus, but it is also possible to apply a personalized model to another model within one electronic apparatus. This will be described with reference to FIGS. 11, 12, 13A, 13B, etc.

FIG. 11 is a diagram briefly illustrating an example of the electronic apparatus for applying the personalized model to a newly-received model according to an embodiment.

Referring to FIG. 11, in a state where a personalized model 13 is stored in an electronic apparatus 300, a new model 14 may be received from the outside in operation S1101.

In this example, the electronic apparatus 300 may identify whether the training data used in the personalization of the personalization model 13 is stored in the electronic apparatus 300 in operation S1102.

If the training data is stored, the electronic apparatus 300 may train the new model 14 using the training data in operation S1103.

If the training data is not stored, the electronic apparatus 300 may generate training data using the personalized model 13 in operation S1104.

The personalized model 13 may obtain one or more input values that cause the personalized model 13 to output a specific output value, and generate training data that includes training data pairs configured with each of the obtained input values.

The electronic apparatus 300 may train the new model 14 using the generated training data.

If the training data is not stored, the electronic apparatus 300 may identify an output difference between the personalized model 13 and the new model 14 in operation S1105 and generate training data based on the difference in operation S1104.

In this example, the electronic apparatus 300 may train a new model using the generated training data.

The embodiments of FIG. 11 for the operation of the electronic apparatus 300 correspond to the fourth scheme described in FIG. 1, and are consistent with the operation of the second electronic apparatus 200 after receiving the training data or personalized model.

Figure 12:
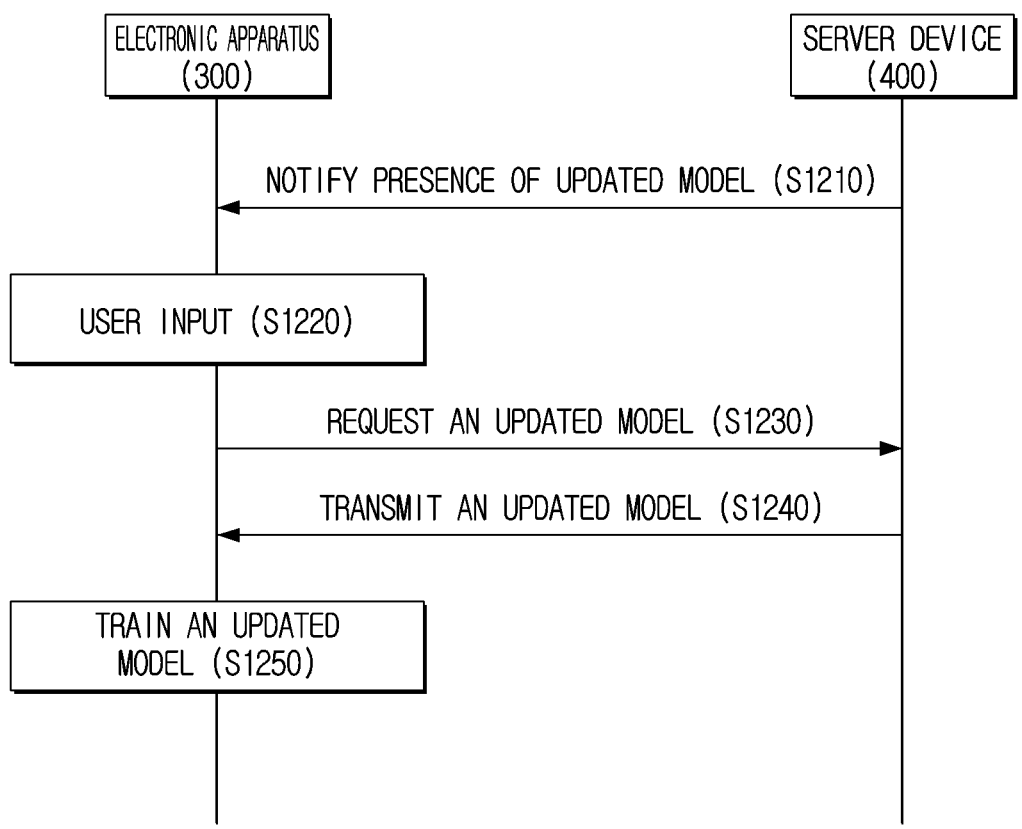
FIG. 12 is a sequence diagram illustrating a process of receiving an updated model and training the model by the electronic apparatus according to an embodiment.

FIG. 12 is a sequence diagram illustrating a process of receiving an updated model and training the model by the electronic apparatus according to an embodiment.

Referring to FIG. 12, the electronic apparatus 300 may be connected in a variety of communication manners with the server device 400. If there is an updated model compared to the personalized model stored in the electronic apparatus 300, the server device 400 may transmit the notification to the electronic apparatus 300 for the presence of the updated model in operation S1210.

In this example, the electronic device 300 may inform the user of the presence of the updated model. As a result, if a user command for downloading the updated model is received in operation S1220, the electronic apparatus 300 may request the updated model to the server device 400 in operation S1230.

As a result, an updated model may be received by the electronic apparatus 30 from a server device 400 in operation S1240.

The electronic apparatus 300 may train the received model as FIG. 11 in operation S1250.

If the training (personalization) of the updated model is terminated, the electronic apparatus 300 may delete the prestored personalization model from the memory.

Figure 13A:
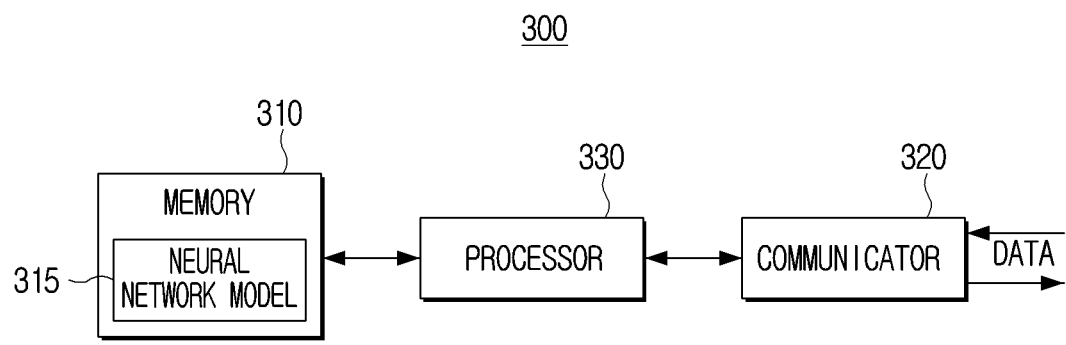
FIG. 13A is a block diagram illustrating a configuration of the electronic apparatus applying a personalized model to a newly-received model according to an embodiment.

FIG. 13A is a block diagram illustrating a configuration of the electronic apparatus 300 applying a personalized model to a newly-received model according to an embodiment. Hereinbelow, the embodiments of FIGS. 11 and 12 will be further described based on the configurations of FIG. 13A.

Referring to FIG. 13A, the electronic apparatus 300 may include a memory 310, a communicator 320, a processor 330, or the like. The electronic apparatus 300 may correspond to various user devices such as a smartphone, a TV, a tablet PC, a desktop PC, a notebook PC, or the like, but is not limited thereto.

A neural network model 315 personalized in the electronic apparatus 300 may be stored in the memory 310.

When a user command for downloading a neural network model, which is an update version of the neural network model 315, is received, the processor 330 may receive the updated neural network model from the server device 400 via the communicator 320.

The processor 330 may train (personalize) the updated neural network model based on information about the neural network model 315 and information about the updated neural network model.

If the training data of the personalized neural network model 315 is stored in the memory 310, the processor 330 may train the updated neural network model based on the stored training data.

If the training data of the personalized neural network model 315 is not stored in the memory 310, the processor 330 may generate training data using the personalized neural network model 315. The processor 330 may train the updated neural network model based on the generated training data. In this example, the processor 330 may train the updated neural network model based on the generated training data while the input data for using the updated neural network model is not input.

In this example, the processor 330 may obtain one or more input values that cause the neural network model 315 to output a specific output value, and train the updated neural network model based on the corresponding output value and the obtained one or more input values.

Alternatively, the processor 330 may input the first input data to the neural network model 315 to obtain first output data, input the first input data to the updated neural network model to obtain second output data, and if the first output data and the second output data are different, the processor 330 may store the first input data and the first output data in the memory 310. The processor 330 may train the updated neural network model based on training data including the first input data and the first output data stored in the memory 310.

Figure 13B:
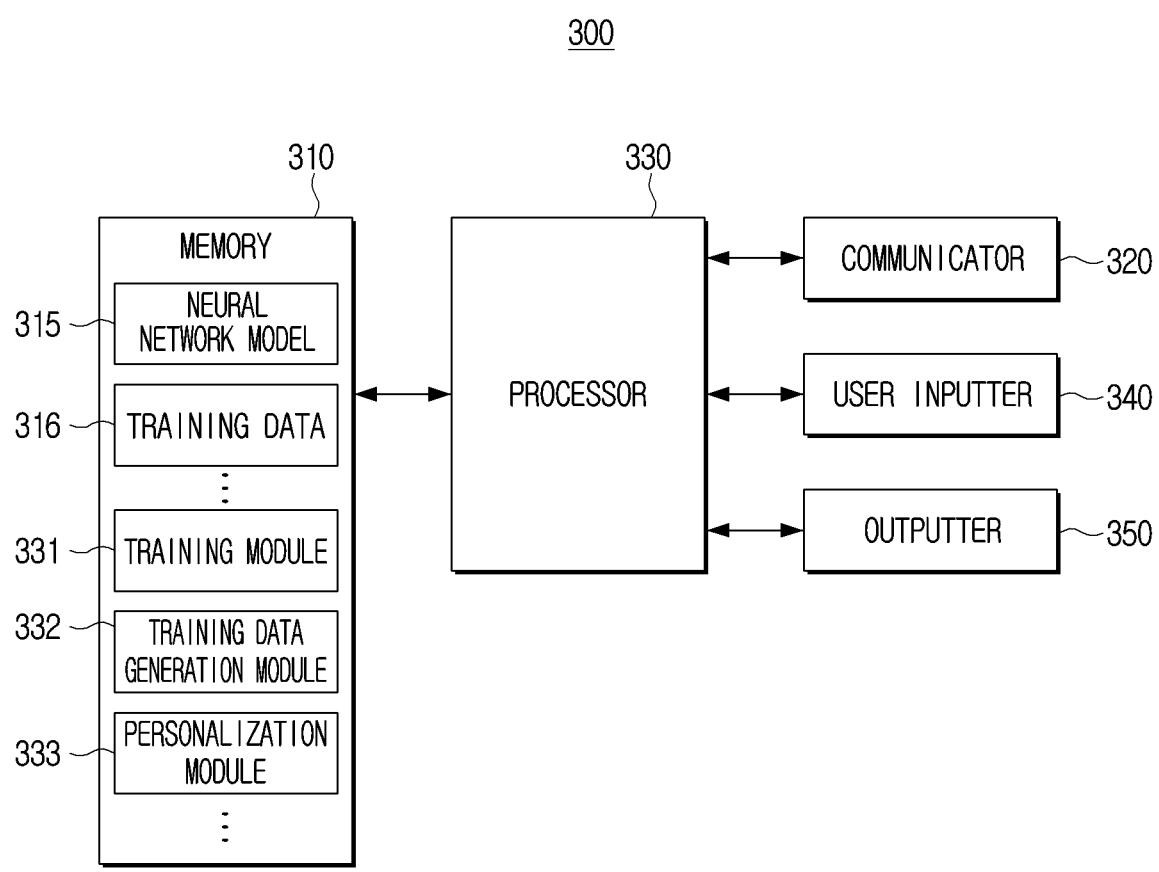
FIG. 13B is a block diagram illustrating an example of a detailed configuration of the electronic apparatus of FIG. 13A.

FIG. 13B is a block diagram illustrating an example of a more detailed configuration of the electronic device 300 of FIG. 13A. Referring to FIG. 13B, the electronic device 300 may further include a user inputter 340, an outputter 350, etc. in addition to the memory 310, the communicator 320, and the processor 330.

Referring to FIG. 13B, the memory 310 may store training data 316 used in the personalization process of the neural network model 315.

Referring to FIG. 13B, the processor 330 may control the training module 331, the training data generation module 332, the personalization module 333, etc. stored in the memory 310. Each of the modules may be stored in software on the memory 310 as in FIG. 13B, may be selectively executed by the processor 330, or implemented in hardware, unlike FIG. 13B and controlled by the processor 330. Alternatively, each of the modules may be in the form of a combination of software and hardware.

The training module 331 is a module to train the neural network model 215 or the updated neural network model based on the training data.

The training data generation module 332 is a module for generating training data for training the updated neural network model. The training data generation module 332 may generate training data including input data and output data from the pre-stored personalized neural network model 315. Alternatively, the training data generation module 332 may generate training data based on an output difference between the neural network model 315 and the updated neural network model for the same input data.

The personalization module 333 is a module for personalizing the neural network model 315. The personalization module 333 may train or update the personalization module 315 based on user input to the electronic apparatus 300 or various input data.

The personalization module 333 may also personalize the newly-received updated neural network model in the same manner.

The electronic apparatus 300 illustrated and described through FIGS. 13A and 13B may also operate as the first electronic apparatus 100 and/or the second electronic apparatus 200 as described above, modules other than the modules illustrated and described in FIG. 13B may be included also.

Figure 14:
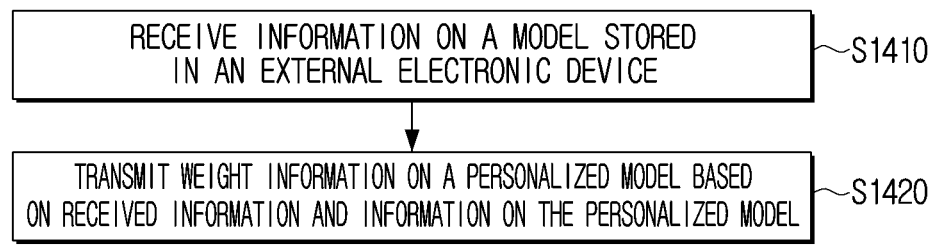
FIG. 14 is a flowchart illustrating a method for applying a personalized model of the electronic apparatus based on a transmitting apparatus and a receiving apparatus, respectively.

FIG. 14 is a flowchart illustrating a method for applying a personalized model of the electronic apparatus according to an embodiment.

Referring to FIG. 14, an electronic apparatus may receive information about a model stored on an external electronic device in operation S1410. In this example, the information about the model may include information about the version of the model, information about the model's functionality and the application in which the model is used, information about the layer structure of the model, and the like.

The electronic apparatus may transmit information on the weight between nodes of the personalized model to the external electronic device based on the received information and information on the personalized model stored in the electronic apparatus in operation S1420. This is based on a situation where the model stored in the external electronic device and the personalized model have the same function.

If the model stored in the external electronic device and the version of the personalized model are the same, information on weight between nodes of the personalized model may be transmitted to the external electronic device. This is based on the situation that the models of the same version have the same layer structure.

However, if the version is not the same, the electronic apparatus may transmit training data used in at least a portion of the personalized model or the personalization process of the personalized model to the external electronic device.

Figure 15:
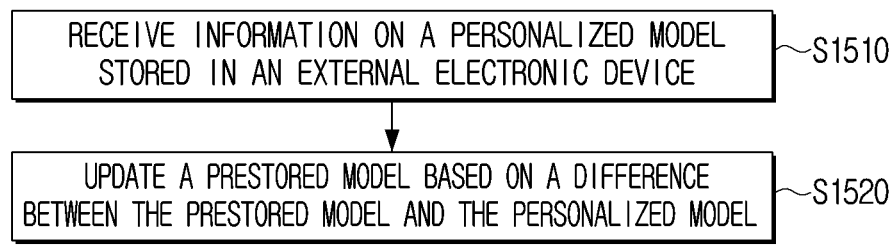
FIG. 15 is a flowchart illustrating a method for applying a personalized model of the electronic apparatus based on a transmitting apparatus and a receiving apparatus, respectively.

FIG. 15 is a flowchart illustrating a method for applying a personalized model of the electronic apparatus according to an embodiment.

Referring to FIG. 15, the electronic apparatus may receive information about a personalized model stored in an external electronic device in operation S1510. In this example, the electronic apparatus may identify whether the personalized model and the model stored in the electronic apparatus have the same function based on the received information.

The electronic apparatus may compare a version and/or layer structure of the personalized model and the model stored in the electronic apparatus based on the received information.

The electronic apparatus may update the prestored model based on the difference between the model prestored in the electronic apparatus and the personalized model in operation S1520.

If the personalized model and the model stored in the electronic apparatus have the same function and the same version, when information on the node of the personalized model is received from the external electronic device, the model stored in the electronic apparatus may be updated based on the information on the received node.

If the personalized model and the model stored in the electronic apparatus have the same functionality but different versions, the electronic apparatus may train the model stored in the electronic apparatus based on training data received from the external electronic device and/or, generate the training data using the personalized model received from the external electronic device, and train the model stored on the electronic device based on the training data.

Figure 16:
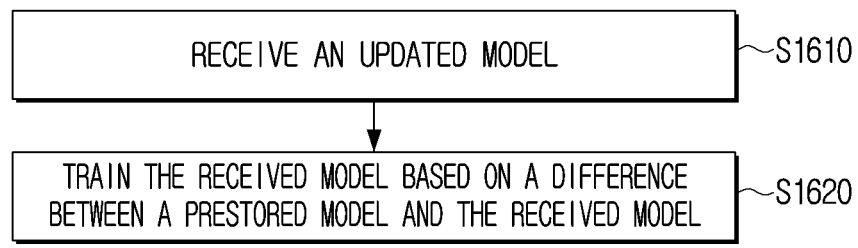
FIG. 16 is a flowchart illustrating a method for applying a personalized model according to an embodiment.

FIG. 16 is a flowchart illustrating a method for applying a personalized model according to an embodiment.

According to an embodiment, based on a personalized model application method of the electronic apparatus in which the personalized model is stored, the electronic apparatus may receive an updated model having the same function as a personalized model from the outside in operation S1610.

The electronic apparatus may train the updated model based on the difference between the prestored personalized model and the updated model in operation S1620.

For example, the updated model may be trained using the training data used in the personalization process of the personalized model.

If the training data is not stored, new training data may be generated using the personalized model, and the updated model may be trained based on the generated training data. The training data may be generated based on an output difference between the personalized model and the updated model, and the updated model may be trained based on the generated training data.

The electronic apparatus that includes a personalized model according to the disclosure may have an effect that a personalized model may forward (apply) a sort of experience obtained through training or updating on the electronic apparatus to another model included in the electronic apparatus or another electronic apparatus.

According to the disclosure, the electronic apparatus including a personalized model may have an effect to minimize the amount of data transmission between devices for applying a personalized model to an external electronic device by selectively transmitting, to an external electronic device, information on the personalized model, information on at least a part of the personalized model, training data used for personalization, or the like, based on a difference between the model stored in an external electronic device and the personalized model.

An electronic apparatus including a neural network model which is not personalized according to the disclosure may have an effect of performing an update of a pre-stored model for both when training data is received from an external electronic device and when at least a part of a personalized model is received from an external electronic device.

The electronic apparatus that applies the pre-stored personalized model to the newly received model according to the disclosure may obtain or generate training data by itself based on a personalized model and effectively personalize the received model using the training data.

The various example embodiments described above may be implemented in a recordable medium which is readable by computer or a device similar to computer using software, hardware, or the combination of software and hardware.

By hardware implementation, the embodiments of the disclosure may be implemented using, for example, and without limitation, at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electric units for performing other functions, or the like.

In some cases, embodiments described herein may be implemented by the processor 120 itself. According to a software implementation, embodiments such as the procedures and functions described herein may be implemented with separate software modules. Each of the above-described software modules may perform one or more of the functions and operations described herein.

The computer instructions for performing the processing operations of the first electronic apparatus 100 according to the various embodiments described above may be stored in a non-transitory computer-readable medium. The computer instructions stored in this non-transitory computer-readable medium may cause the above-described specific device to perform the processing operations in the first electronic apparatus 100 according to the above-described various example embodiments when executed by the processor of the device.

The non-transitory computer readable medium may refer, for example, to a medium that stores data semi-permanently, and is readable by an apparatus. For example, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like.

The foregoing example embodiments and advantages are merely examples and are not to be understood as limiting the disclosure. The present disclosure may be readily applied to other types of devices. The description of the embodiments of the disclosure is intended to be illustrative, and not to limit the scope of the claims, and many alternatives, modifications, and variations will be apparent to those skilled in the art.

What is claimed is:

1. An electronic apparatus comprising:
    a display;
    at least one memory storing at least one instruction and a first artificial intelligence (AI) model;
    a communicator comprising communication circuitry; and
    at least one processor including processing circuitry,
    wherein the at least one instruction, when executed by the at least one processor, causes the electronic device to:
    control the display to provide a user interface that enables a user to select an AI model communication mode, between an AI model transmission mode, which transmits information on AI model from the electronic apparatus to an external electronic device, and an AI model reception mode, which receives information on AI model from the external electronic device;
    based on the AI model communication mode of the electronic apparatus being set to the AI model transmission mode, receive, from the external electronic device, that is set to the AI model reception mode, information on a second AI model stored in the external electronic device through the communicator;
    compare a model structure of the first AI model with a model structure of the second AI model based on the information on the second AI model that indicates a layer structure, an internal node configuration, and a node connection of the second AI model; and
    control the communicator to transmit, to the external electronic device, the information on AI model containing changed node weights of the first AI model, without transmitting information of the entire first AI model, in response to a determination that the model structure of the second AI model is identical to the model structure of the first AI model,
    wherein the changed node weights are node weights changed in a personalization process.

2. The electronic apparatus of claim 1, wherein the at least one instruction, when executed by the at least one processor, causes the electronic device to:
    based on the model structure of the second AI model being different from the model structure of the first AI model, determine whether there is training data for training the second AI model;
    based on the model structure of the second AI model being different from the model structure of the first AI model, and the training data for training the second AI model being present, control the communicator to transmit the training data to the external electronic device; and
    based on the model structure of the second AI model being different from the model structure of the first AI model, and the training data for training the second AI model not being present, generate the training data based on an output difference between the first AI model and the second AI model and control the communicator to transmit the training data to the external electronic device.

3. The electronic apparatus of claim 1, wherein the at least one instruction, when executed by the at least one processor, causes the electronic device to:
based on a node added to the first AI model to customize the first AI model in the electronic apparatus, control the communicator to transmit, to the external electronic device, information on the added node and the node weights of the first AI model.

4. The electronic apparatus of claim 1, wherein the at least one instruction, when executed by the at least one processor, causes the electronic device to, based on the structure of the first AI model and the structure of the second AI model being different, control the communicator to transmit one of the first AI model and training data used to customize the first AI model.

5. The electronic apparatus of claim 4, wherein the at least one instruction, when executed by the at least one processor, causes the electronic device to:
based on the structure of the first AI model being different from the structure of the second AI model, identify whether training data used for training of the first AI model is stored in the at least one memory, and
based on the training data being stored in the at least one memory, control the communicator to transmit the training data to the external electronic device.

6. The electronic apparatus of claim 5, wherein the at least one instruction, when executed by the at least one processor, causes the electronic device to:
based on the training data not being stored in the at least one memory, control the communicator to transmit the first AI model to the external electronic device.

7. An electronic apparatus comprising:
a display;
at least one memory storing at least one instruction and a first artificial intelligence (AI) model;
a communicator comprising communication circuitry; and
at least one processor including processing circuitry,
wherein the at least one instruction, when executed by the at least one processor, causes the electronic device to:
control the display to provide a user interface that enables a user to select an AI model communication mode, between an AI model transmission mode, which transmits information on AI model from the electronic apparatus to an external electronic device, and an AI model reception mode, which receives information on AI model from the external electronic device;
based on the AI model reception mode being selected through the user interface, and receiving a user command to download a second AI model that is an updated version of the first AI model, establishing a connection between the electronic apparatus and the external electronic device that is set to the AI model transmission mode and stores the second AI model;
in response to a determination that a model structure of the first AI model is identical to a model structure of the second AI model, receive the information on AI model containing node weights of the second AI model, without receiving the entire second AI model, and update the first AI model using the node weights of the second AI model;
based on the model structure of the first AI model being different from the model structure of the second AI model, and training data used for training the second AI model not being stored in a server device, receive the second AI model from the server device through the communicator and train the first AI model based on an output difference between the first AI model and the second AI model; and
based on the model structure of the first AI model being different from the model structure of the second AI model, and the training data used for training the second AI model being stored in the server device, receive the training data from the server device and train the first AI model using the training data that is received from the server device.

8. The electronic apparatus of claim 1, wherein the at least one instruction, when executed by the at least one processor, causes the electronic device to:
compare the model structure of the first AI model with the model structure of the second AI model based on the internal node configuration indicating whether a new node is added to the second AI model via the personalization process.

9. The electronic apparatus of claim 7, wherein the at least one instruction, when executed by the at least one processor, causes the electronic device to:
obtain first output data and second output data from the first AI model and the second AI model, respectively by inputting same input data to the first AI model and the second AI model; and
obtain a difference between the first output data and the second output data as the output difference between the first AI model and the second AI model.

10. The electronic apparatus of claim 7, wherein the at least one instruction, when executed by the at least one processor, causes the electronic device to:
obtain first output data by inputting first input data to the first AI model, and obtain second output data by inputting the first input data to the second AI model;
based on the first output data and the second output data being different, store the first input data and the first output data in the at least one memory; and
train the second AI model based on the first input data and the first output data stored in the at least one memory.

11. The electronic apparatus of claim 7, wherein the at least one instruction, when executed by the at least one processor, causes the electronic device to:
while input data for using the second AI model not being input, train the second AI model based on the generated training data.

* * * * *